(12) United States Patent
Maruyama

(10) Patent No.: US 8,169,673 B2
(45) Date of Patent: May 1, 2012

(54) ILLUMINATING DEVICE AND IMAGE READING APPARATUS

(75) Inventor: Hiroyuki Maruyama, Ishikawa (JP)

(73) Assignee: PFU Limited, Ishikawa (JP)

( * ) Notice: Subject to any disclaimer, the term of this patent is extended or adjusted under 35 U.S.C. 154(b) by 432 days.

(21) Appl. No.: 12/551,437

(22) Filed: Aug. 31, 2009

(65) Prior Publication Data

US 2010/0110505 A1 May 6, 2010

(30) Foreign Application Priority Data

Oct. 30, 2008 (JP) ................................. 2008-279175

(51) Int. Cl.
*H04N 1/04* (2006.01)

(52) U.S. Cl. ......... 358/475; 358/461; 358/484; 358/481

(58) Field of Classification Search .................. 358/475, 358/461, 484, 481
See application file for complete search history.

(56) References Cited

U.S. PATENT DOCUMENTS 7,760,403 B2 * 7/2010 Sakurai ......................... 358/484

FOREIGN PATENT DOCUMENTS

JP 38850588 B2 11/2006

* cited by examiner

*Primary Examiner* — Houshang Safaipour

(74) *Attorney, Agent, or Firm* — Lowe, Hauptman, Ham & Berner, LLP

(57) ABSTRACT

An illuminating device includes a linear light source mounted on a mounting surface of a board, with a plurality of light-emitting elements being arrayed thereon, for irradiating light toward an illuminating target, a white reflecting surface provided in a planar shape parallel to an optical axis of the linear light source on a surface including the mounting surface, to reflect the light from the linear light source, and a mirror surface formed in a planar shape that reflects the light from the linear light source and reflected light from the white reflecting surface. The linear light source, the white reflecting surface, and the mirror surface are arranged such that a third plane crosses a first plane on the illuminating target side than a second plane, and $0°<\theta_W<\theta_R<90°$ is satisfied.

12 Claims, 12 Drawing Sheets

SUB-SCANNING DIRECTION

SUB-SCANNING DIRECTION

SUB-SCANNING POSITION

ORIGINAL SURFACE
(IRRADIATION SURFACE)

SUB-SCANNING DIRECTION (LIGHT SOURCE SIDE) (MIRROR SIDE)
SUB-SCANNING POSITION

ILLUMINATING DEVICE AND IMAGE READING APPARATUS

RELATED APPLICATIONS

The present application is based on, and claims priority from, Japan Application Number 2008-279175, filed Oct. 30, 2008, the disclosure of which is hereby incorporated by reference herein in its entirety.

BACKGROUND OF THE INVENTION

1. Field of the Invention

The present invention relates to an illuminating device and an image reading apparatus, and, more particularly to an illuminating device that illuminates an image reading target in an image reading apparatus using a one-dimensional image sensor, and an image reading apparatus.

2. Description of the Related Art

As an illuminating device in an image reading apparatus using a conventional one-dimensional image sensor, there has been proposed an illuminating device in which a plurality of light-emitting elements that irradiate light toward an illuminating target, such as a plurality of light emitting diodes (LEDs), are arrayed linearly along a main scanning direction of an image sensor, and the LEDs are simultaneously lighted, thereby illuminating the illuminating target as the image reading target.

As an image reading apparatus having such a conventional illuminating device, for example, Japanese Patent No. 3885088 discloses an image sensor unit including first and second illuminating devices that illuminate an original as an illuminating target, an imaging unit that images reflected light from the original, and a sensor array as a one-dimensional image sensor in which a plurality of pixels that convert the reflected light to an electric signal are arranged in a line configuration. In the image sensor unit disclosed in Japanese Patent No. 3885088, each of the first and second illuminating devices has a transparent body that emits light with substantially uniform quantity of illumination light over the length of one line of an image reading unit in a line configuration constituted by the pixels, and are arranged to be facing each other on the opposite sides of the imaging unit.

Such a conventional illuminating device and image reading apparatus can include, for example, a pair of a linear light source and a curved reflector (a curved reflecting surface) that reflects light irradiated from the linear light source toward an illuminating target along a main scanning direction, on both sides of a range in which an image sensor can read an image with respect to a sub-scanning direction of the image sensor. In this case, because irradiation intensity can be increased while stabilizing (uniformizing) illuminance distribution of the image sensor in the sub-scanning direction, illumination efficiency can be improved, although the apparatus may become larger. On the other hand, for example, when a linear light source and a curved reflector (a curved reflecting surface) that reflects light irradiated from the linear light source toward an illuminating target are provided along the main scanning direction on one side of the range in which the image sensor can read the image in the sub-scanning direction of the image sensor, and a curved reflector having a different shape is provided on the other side, the size of the apparatus can be reduced because the number of linear light sources is one less. However, the illuminance distribution of the image sensor in the sub-scanning direction becomes uneven, and because the irradiation intensity decreases, the illumination efficiency may be reduced.

SUMMARY OF THE INVENTION

It is an object of the present invention to at least partially solve the problems in the conventional technology.

According to an aspect of the present invention, an illuminating device includes a linear light source mounted on a mounting surface of a board, with a plurality of light-emitting elements being arrayed thereon for irradiating light toward an illuminating target; a white reflecting surface provided in a planar shape parallel to an optical axis of the linear light source on a surface including the mounting surface, to reflect light from the linear light source; and a mirror surface formed in a planar shape that reflects the light from the linear light source and reflected light from the white reflecting surface. When a surface including an optical axis of an imaging optics that images the reflected light from the illuminating target, and a row of pixels of a line sensor in which a plurality of pixels that convert the reflected light from the illuminating target imaged by the imaging optics to an electric signal and read an image on the illuminating target are arrayed in a main scanning direction is designated as a first plane, a surface including the mirror surface is designated as a second plane, a surface including the white reflecting surface is designated as a third plane, a region of space on one side where the linear light source and the white reflecting surface are arranged, using the first plane as a boundary, is designated as a light source region, a region of space on the other side where the mirror surface is arranged, using the first plane as a boundary, is designated as a mirror region, a first angle formed by the first plane and the second plane on the mirror region side and on the illuminating target side is designated as $\theta_R$, and a second angle formed by the first plane and the third plane on the light source region side and on the linear light source side is designated as $\theta_W$, the linear light source, the white reflecting surface, and the mirror surface are arranged such that the third plane crosses the first plane on the illuminating target side than the second plane, and $0° < \theta_W < \theta_R < 90°$ is satisfied.

According to another aspect of the present invention, an image reading apparatus includes an imaging optics that images reflected light from an illuminating target; a line sensor in which a plurality of pixels that convert the reflected light from the illuminating target imaged by the imaging optics to an electric signal and read an image on the illuminating target are arrayed in a main scanning direction; and an illuminating device. The illuminating device includes a linear light source mounted on a mounting surface of a board, with a plurality of light-emitting elements being arrayed thereon for irradiating light toward the illuminating target, a white reflecting surface provided in a planar shape parallel to an optical axis of the linear light source on a surface including the mounting surface, to reflect light from the linear light source, and a mirror surface formed in a planar shape that reflects the light from the linear light source and reflected light from the white reflecting surface. When a surface including an optical axis of the imaging optics, and a row of pixels of the line sensor is designated as a first plane, a surface including the mirror surface is designated as a second plane, a surface including the white reflecting surface is designated as a third plane, a region of space on one side where the linear light source and the white reflecting surface are arranged, using the first plane as a boundary, is designated as a light source region, a region of space on the other side where the mirror surface is arranged, using the first plane as a boundary, is designated as a mirror region, a first angle formed by the first plane and the second plane on the mirror region side and on the illuminating target side is designated as $\theta_R$, and a second angle formed by the first plane and the third plane on the light source region side and on the linear light source side is designated as $\theta_W$, the linear light source, the white reflecting surface, and the mirror surface are arranged such that the third plane crosses the first plane on the illuminating target side than the second plane, and $0°<\theta_W<\theta_R<90°$ is satisfied.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an illuminating device and an image reading apparatus according to the present invention will be explained below in detail with reference to the accompanying drawings. The present invention is not limited to the embodiments. In addition, constituent elements in the following embodiments include elements replaceable and easily achievable by those skilled in the art, or substantially the same elements.

Figure 1:
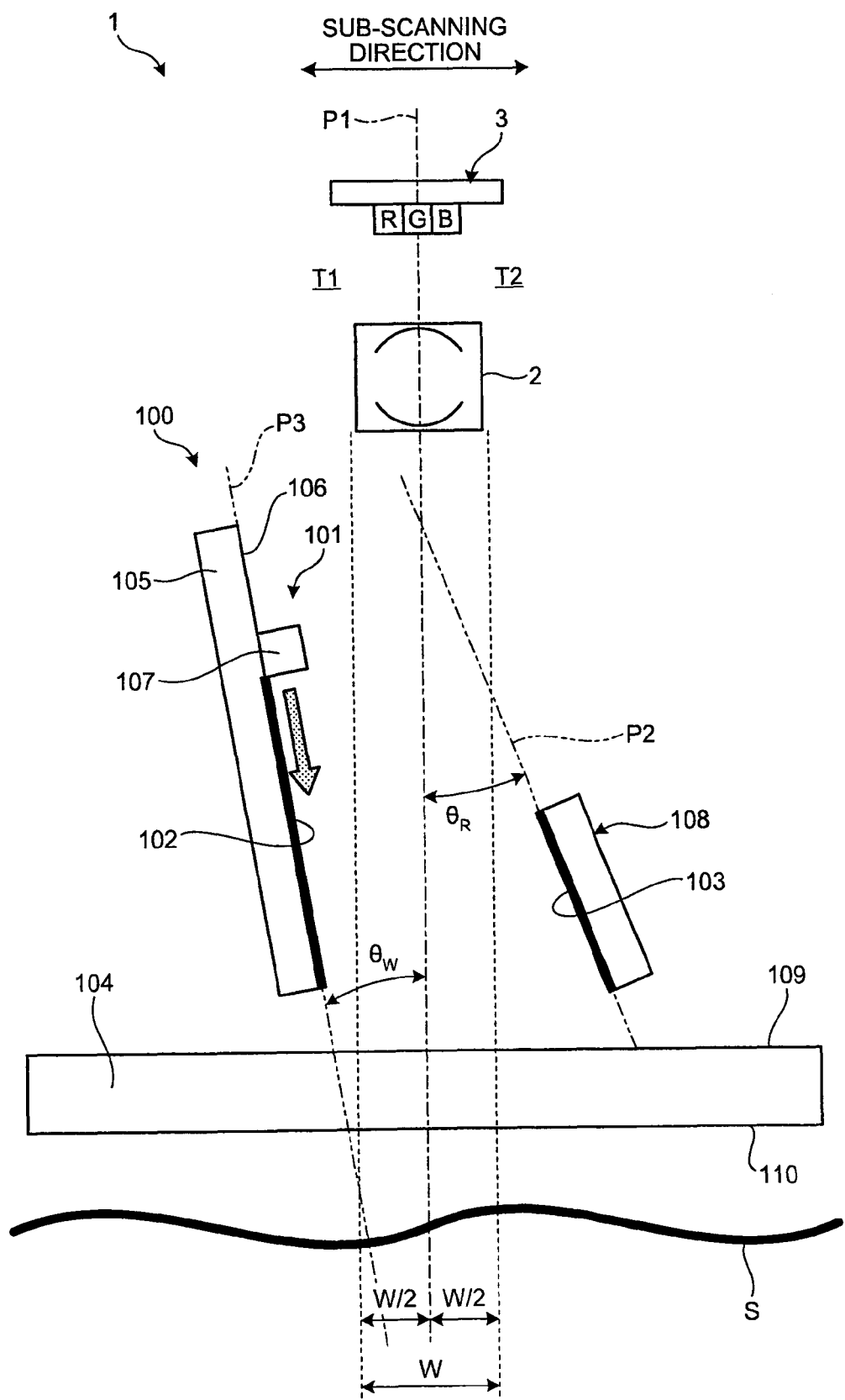
FIG. 1 is a schematic configuration diagram of an illuminating device and an image reading apparatus according to a first embodiment of the present invention.
Figure 2:
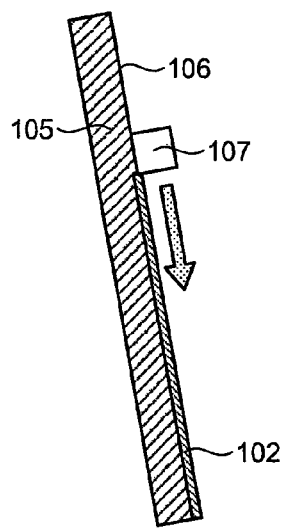
FIG. 2 is a schematic sectional view for explaining a white reflecting surface provided in the illuminating device and the image reading apparatus according to the first embodiment.
Figure 3:
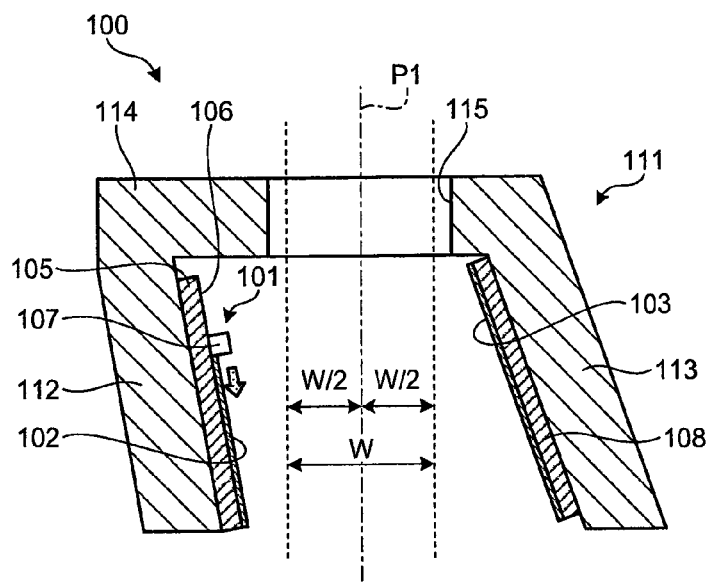
FIG. 3 is a schematic sectional view for explaining of a casing provided in the illuminating device and the image reading apparatus according to the first embodiment.
Figure 4:
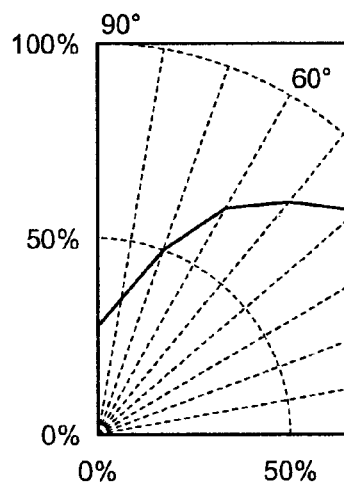
FIG. 4 is a schematic diagram for explaining a light distribution characteristic of an LED-array light source and the white reflecting surface in the illuminating device and the image reading apparatus according to the first embodiment.
Figure 4:
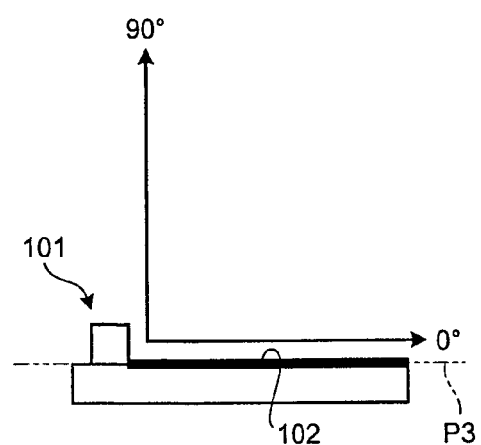
Figure 5:
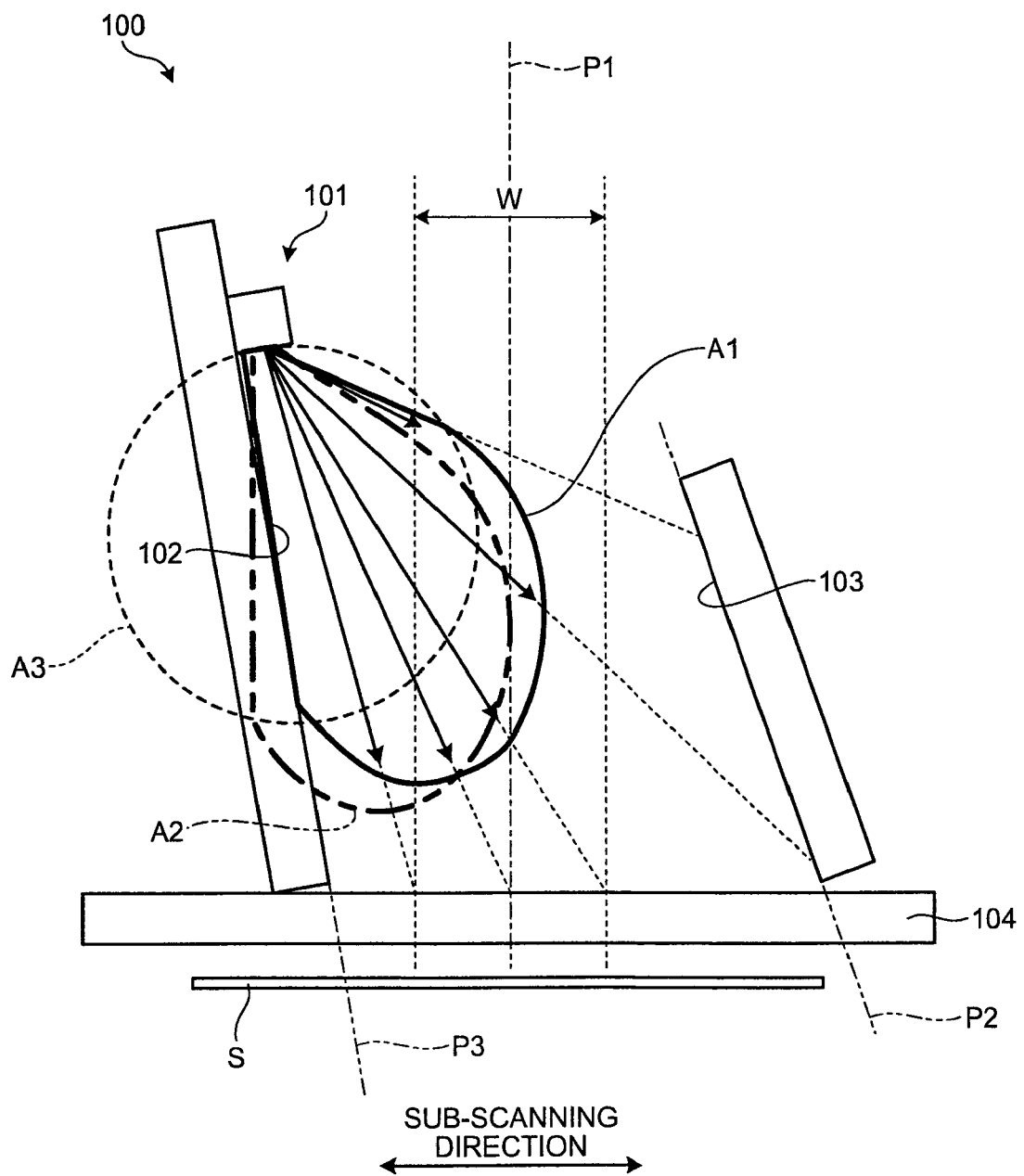
FIG. 5 is a schematic diagram for explaining a light distribution characteristic when the LED-array light source and the white reflecting surface in the illuminating device and the image reading apparatus according to the first embodiment are inclined.
Figure 6:
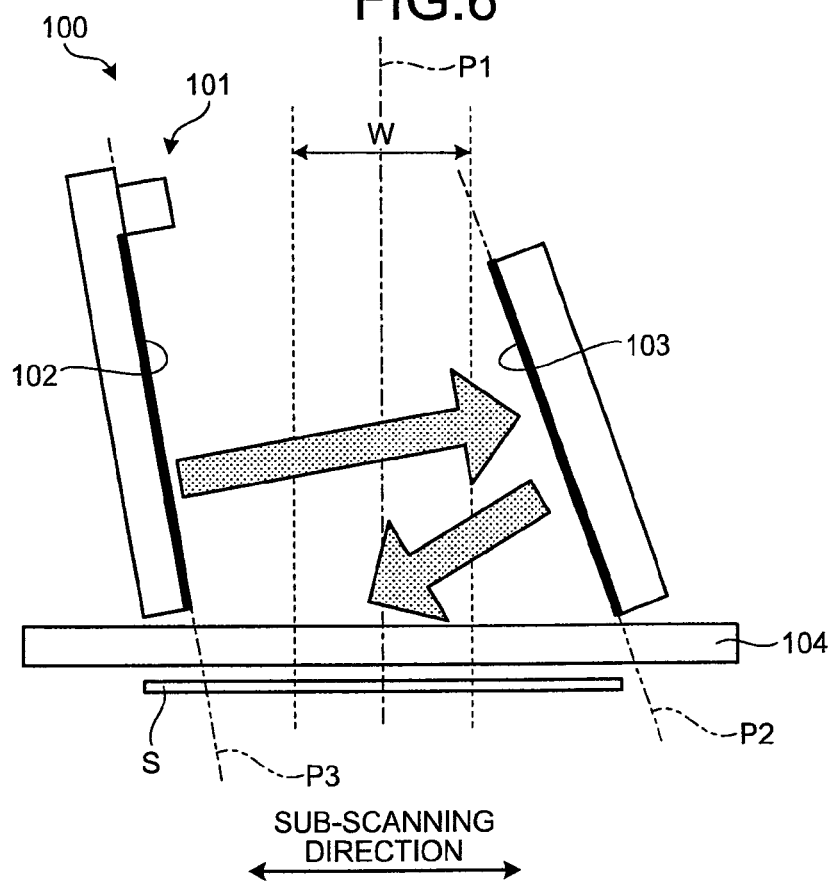
FIG. 6 is a schematic diagram for explaining reflection on a mirror surface in the illuminating device and the image reading apparatus according to the first embodiment.
Figure 7:
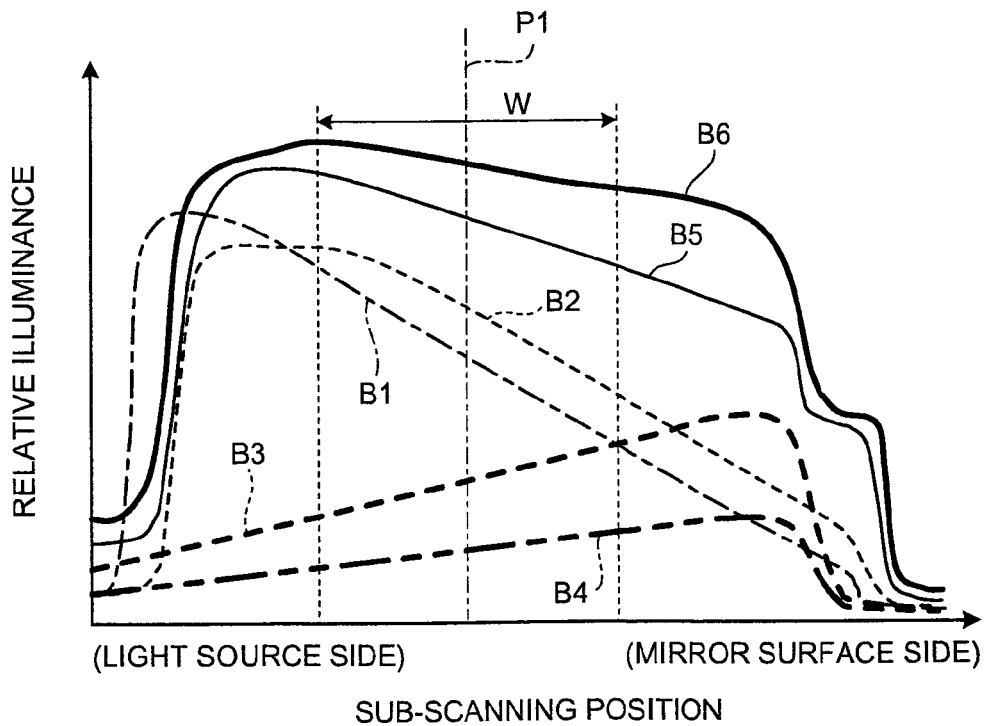
FIG. 7 is a schematic diagram for explaining illuminance distribution in a sub-scanning direction of the illuminating device and the image reading apparatus according to the first embodiment.

FIG. 1 is a schematic configuration diagram of an illuminating device and an image reading apparatus according to a first embodiment of the present invention, FIG. 2 is a schematic sectional view for explaining a white reflecting surface provided in the illuminating device and the image reading apparatus according to the first embodiment, FIG. 3 is a schematic sectional view for explaining a casing provided in the illuminating device and the image reading apparatus, FIG. 4 is a schematic diagram for explaining a light distribution characteristic of an LED-array light source and the white reflecting surface in the illuminating device and the image reading apparatus, FIG. 5 is a schematic diagram for explaining the light distribution characteristic when the LED-array light source and the white reflecting surface in the illuminating device and the image reading apparatus are inclined, FIG. 6 is a schematic diagram for explaining reflection on a mirror surface in the illuminating device and the image reading apparatus, and FIG. 7 is a schematic diagram for explaining illuminance distribution in a sub-scanning direction of the illuminating device and the image reading apparatus.

As shown in FIG. 1, an illuminating device 100 according to the first embodiment illuminates an original (hereinafter, "sheet S") as an illuminating target, which is explained for a case that it is applied to an image reading apparatus 1. In the embodiments explained below, the image reading apparatus 1 is an image scanner. However, the present invention is not limited thereto, and the image reading apparatus 1 can be a copying machine, a fax machine, or a character recognizing apparatus, which scans an image reading medium by an image sensor.

The image reading apparatus 1 reads an image on the sheet S as an image reading target illuminated by the illuminating device 100. The image reading apparatus 1 optically scans the image on the sheet S and reads the image as image data by converting a scanned image to an electric signal, and includes the illuminating device 100, a lens 2 as an imaging optics, and a line sensor 3. In the image reading apparatus 1 according to the first embodiment, the illuminating device 100, the lens 2, and the line sensor 3 are arranged in this order from the sheet S side with respect to a direction of an optical axis of the lens 2.

The illuminating device 100 includes an LED-array light source 101 as a linear light source, a white reflecting surface 102, a mirror surface 103, and a glass plate 104 as a transparent member. In the illuminating device 100, the LED-array light source 101 irradiates light toward the sheet S, and the white reflecting surface 102 and the mirror surface 103 reflect a part of the irradiated light toward the sheet S, thereby irradiating the sheet S. The glass plate 104 is formed of a transparent material having a rectangular plate-like shape, here it is formed of a glass, and is arranged between the LED-array light source 101 and the sheet S. The glass plate 104 presses the sheet S toward an original table (not shown), to prevent that the sheet S floats from the original table. The configuration of the illuminating device 100 will be explained later in detail.

The lens 2 images reflected light from the sheet S. The lens 2 focuses and images the reflected light irradiated from the illuminating device 100 and reflected by the sheet S onto a light receiving surface of the line sensor 3.

The line sensor 3 reads an image by receiving by a plurality of pixels of the line sensor 3 the reflected light irradiated from the illuminating device 100, reflected by the sheet S, and imaged by passing through the lens 2, and converting the reflected light to an electric signal. The line sensor 3 is, for example, a linear image sensor (one-dimensional image sensor) in which a plurality of photoelectric conversion elements that receive light to generate electric charges are arrayed linearly as the plurality of pixels. In the line sensor 3, an array direction of the photoelectric conversion elements is the main scanning direction of the line sensor 3, and a direction orthogonal to the main scanning direction is the sub-scanning direction thereof. In FIG. 1, a depth direction in the drawing (a direction perpendicular to the plane shown in FIG. 1) is the main scanning direction of the line sensor 3, and a left and right (lateral) direction in the drawing is the sub-scanning direction of the line sensor 3.

In the image reading apparatus 1, the line sensor 3 and the sheet S are relatively moved in the sub-scanning direction by a relative movement mechanism (not shown), so that the line sensor 3 scans the sheet S in the sub-scanning direction, to read a two-dimensional image on the sheet S.

That is, in the image reading apparatus 1 configured as described above, the light irradiated from the illuminating device 100 to the sheet S is reflected by the sheet S and focused and imaged. The reflected light via the lens 2 enters into the line sensor 3 and is converted to an electric signal, and the image on the sheet S is read for each read line along the main scanning direction. In the image reading apparatus 1, the two-dimensional image on the sheet S can be read by relatively moving the line sensor 3 and the sheet S in the sub-scanning direction by the relative movement mechanism (not shown), to sequentially read the image along the sub-scanning direction by the line sensor 3.

The relative movement mechanism in the image reading apparatus 1 can have such a configuration that the line sensor 3 is moved together with the illuminating device 100 along the sub-scanning direction so that the line sensor 3 and the sheet S are relatively moved in the sub-scanning direction, or such a configuration that the sheet S is moved along the sub-scanning direction, so that the line sensor 3 and the sheet S are relatively moved in the sub-scanning direction. That is, the image reading apparatus 1 can be a flat-bed scanner or a handy scanner in which the line sensor 3 is moved with respect to the sheet S so that the line sensor 3 and the sheet S are relatively moved in the sub-scanning direction, or an automatic sheet feed scanner in which the sheet S is moved with respect to the line sensor 3 so that the line sensor 3 and the sheet S are relatively moved in the sub-scanning direction.

The illuminating device 100 is explained next in detail. The illuminating device 100 according to the first embodiment realizes downsizing of the device and illumination efficiency by arranging the LED-array light source 101, the white reflecting surface 102, and the mirror surface 103 in predetermined positional relations.

As described above, the LED-array light source 101 first irradiates light toward the sheet S. The LED-array light source 101 is mounted on a mounting surface 106 of a board 105 with a plurality of light-emitting elements (LEDs 107) being arrayed.

The board 105 is, for example, a rectangular plate-like printed circuit board extending along the main scanning direction. The printed circuit board includes a conductor pattern formed of a conductive material and fixed on a surface thereof made of a material having high electrical insulating properties or inside the board. For example, a wiring pattern is drawn by a copper foil on a glass-reinforced epoxy resin board having high insulating properties, thereby achieving an electronic circuit. The mounting surface 106 forms a surface provided on one side of the board 105 as the printed circuit board, on which the LEDs 107 are mounted.

A so-called side-view LED is applied to the LED 107. The side-view LED 107 is provided to be vertically protruded from the mounting surface 106 of the board 105. A light-emitting surface is set to face the sheet S, that is, the glass plate 104, and a light irradiation direction is set to be the sheet S side (the glass plate 104 side). The side-view LED 107 is also set so that an optical axis thereof becomes parallel to the mounting surface 106 of the board 105.

The LED-array light source 101 is formed by arranging the side-view LEDs 107 in one line with equal interval in a predetermined array direction. The LED-array light source 101 is arranged along the main scanning direction of the line sensor 3 (in a depth direction in FIG. 1) to form a linear light source, that is, can irradiate linear light to the sheet S.

The white reflecting surface 102 forms a so-called Lambertian surface, and reflects a part of the light from the LED-array light source 101. The Lambertian surface is a diffuse reflecting surface in which an intensity of light discharged from an arbitrary minute surface portion to a certain given direction has a property proportional to a cosine of an angle formed between the direction of the light and a normal vertical to the surface.

As shown in FIG. 2, the white reflecting surface 102 is provided on a surface including the mounting surface 106 of the board 105. The white reflecting surface 102 is provided so that it is parallel to the mounting surface 106 in a range on a light irradiating side of the LED-array light source 101 on the mounting surface 106. Therefore, the white reflecting surface 102 is provided in a planar shape parallel to the optical axis of the LED-array light source 101. The mounting surface 106 is formed by applying a white resist to the board 105, and the white reflecting surface 102 is formed of the white resist on the mounting surface 106 of the board 105. Accordingly, the white reflecting surface 102 can be formed at a low cost. The white reflecting surface 102 reflects a part of the irradiation light from the LED-array light source 101 toward the sheet S and the mirror surface 103.

Referring back to FIG. 1, the mirror surface 103 is provided on a surface of a rectangular plate-like mirror member 108 extending along the main scanning direction, and reflects a part of the irradiation light from the LED-array light source 101 and a part of reflected light from the white reflecting surface 102 toward the sheet S. The mirror surface 103 is a mirror reflecting surface formed in a planar shape on the surface of the mirror member 108, and reflects the light from the LED-array light source 101 and the reflected light from the white reflecting surface 102.

The illuminating device 100 is provided with the LED-array light source 101 and the white reflecting surface 102 on one side of the optical axis of the lens 2 (that is, a first plane P1 described later) and the mirror surface 103 on the other side in the sub-scanning direction. The white reflecting surface 102 and the mirror surface 103 are basically arranged opposite to each other in the sub-scanning direction. The LED-array light source 101, the white reflecting surface 102, and the mirror surface 103 are provided outside a read range W, in which the line sensor 3 can read the image on the sheet S in the sub-scanning direction. The read range W is a range in which a central position in the sub-scanning direction is positioned on the optical axis of the lens 2 (that is, the first plane P1 described later).

As described above, the glass plate 104 is formed of a rectangular plate-like transparent material (glass in this embodiment), and arranged between the LED-array light source 101 and the sheet S. The glass plate 104 is arranged such that a surface 109 on the LED-array light source 101 side and a surface 110 on the sheet S side are both orthogonal to the optical axis of the lens 2 (that is, the first plane P1 described later).

As shown in FIG. 3, the illuminating device 100 includes a casing 111, and the LED-array light source 101, the white reflecting surface 102, and the mirror surface 103 are accommodated in the casing 111. The casing 111 includes a light-source-side wall body 112, a mirror-side wall body 113, a connecting wall body 114, and an end-face wall body (not shown).

The light-source-side wall body 112 is formed in a rectangular plate-like shape extending along the main scanning direction, and is provided with the LED-array light source 101 and the white reflecting surface 102 together with the board 105.

The mirror-side wall body 113 is formed in a rectangular plate-like shape extending along the main scanning direction, and is provided with the mirror surface 103 together with the mirror member 108.

Because the white reflecting surface 102 and the mirror surface 103 are basically provided outside the read range W opposite to each other in the sub-scanning direction, putting the optical axis of the lens 2 (in other words, the first plane P1 described later) therebetween, the light-source-side wall body 112 and the mirror-side wall body 113 are also arranged outside the read range W opposite to each other in the sub-scanning direction, putting the optical axis of the lens 2 (in other words, the first plane P1 described later) therebetween. The light-source-side wall body 112 and the mirror-side wall body 113 are respectively provided with the LED-array light source 101, the white reflecting surface 102 and the mirror surface 103 fixed on surfaces facing each other.

The connecting wall body 114 is formed in a rectangular plate-like shape extending along the main scanning direction, to connect the light-source-side wall body 112 and the mirror-side wall body 113. The connecting wall body 114 connects the light-source-side wall body 112 and the mirror-side wall body 113 on a side opposite to a light irradiating side by the LED-array light source 101.

Therefore, the casing 111 is formed of the light-source-side wall body 112, the mirror-side wall body 113, and the connecting wall body 114 as a whole, with a sectional shape in the sub-scanning direction being a substantially inverted U shape, and the glass plate 104 (see FIG. 1) is arranged on an opening side thereof, that is, on the light irradiating side by the LED-array light source 101. In the casing 111, because opposite end faces in the main scanning direction of the light-source-side wall body 112, the mirror-side wall body 113, and the connecting wall body 114 are closed by an end-face wall body (not shown), a space for casing the LED-array light source 101, the white reflecting surface 102, and the mirror surface 103 is laid out. That is, the LED-array light source 101 and the white reflecting surface 102 are fixed on a surface on a casing space side of the light-source-side wall body 112 together with the board 105 and accommodated, and the mirror surface 103 is fixed on a surface on a casing space side of the mirror-side wall body 113 together with the mirror member 108 and accommodated.

The connecting wall body 114 of the casing 111 is provided with an opening 115 corresponding to the read range W of the line sensor 3 (see FIG. 1). The opening 115 is formed slightly wider than the read range W of the line sensor 3 in the sub-scanning direction, and formed in a rectangular shape along the main scanning direction by the connecting wall body 114. Therefore, because the reflected light from the sheet S passes through the opening 115 in the connecting wall body 114, the line sensor 3 can receive the reflected light from the sheet S via the lens 2.

In the casing 111 according to the first embodiment, the light-source-side wall body 112, the mirror-side wall body 113, the connecting wall body 114, and the end-face wall body (not shown) are integrally formed. Therefore, in the illuminating device 100, because the casing 111 is integrally formed of the light-source-side wall body 112, the mirror-side wall body 113, the connecting wall body 114, and the end-face wall body, the LED-array light source 101, the white reflecting surface 102, and the mirror surface 103 can be fixed to the same member, thereby enabling to reliably secure the positional relations thereof with appropriate positional relations described later.

Further, in the illuminating device 100, heat dissipation can be improved by forming the casing 111, in which the light-source-side wall body 112, the mirror-side wall body 113, the connecting wall body 114, and the end-face wall body (not shown) are integrally formed, for example, by using a material having high heat conductivity. Therefore, heat generated in the board 105 at the time of irradiating light by the LED 107 can be favorably dissipated from the casing 111, and as a result, for example, warpage of the board 105 can be suppressed, and durability of the LED 107 can be improved.

Referring back to FIG. 1, the positional relations of the LED-array light source 101, the white reflecting surface 102, and the mirror surface 103 are more specifically explained.

To explain the appropriate positional relations of the LED-array light source 101, the white reflecting surface 102, and the mirror surface 103, preconditions described below are set.

A surface including the optical axis of the lens 2 and a row of pixels of the line sensor 3 (a central position of the read range W along the sub-scanning direction in the row of pixels) is designated as the first plane P1. The first plane P1 passes the central position of the read range W on the light receiving surface of the line sensor 3.

A surface including the mirror surface 103 (mirror reflecting surface on the surface) is designated as a second plane P2.

A surface including the white reflecting surface 102 (diffuse reflecting surface on the surface) is designated as a third plane P3.

A region of space on one side where the LED-array light source 101 and the white reflecting surface 102 are arranged, using the first plane P1 as a boundary, is designated as a light source region T1.

A region of space on the other side where the mirror surface 103 is arranged, using the first plane P1 as the boundary, is designated as a mirror region T2.

A first angle formed by the first plane P1 and the second plane P2 on the mirror region T2 side and on the sheet S side is designated as $\theta_R$.

A second angle formed by the first plane P1 and the third plane P3 on the light source region T1 side and on the LED-array light source 101 side is designated as $\theta_W$.

The LED-array light source 101, the white reflecting surface 102, and the mirror surface 103 are arranged under the preconditions set as described above so that the third plane P3 crosses the first plane P1 on the sheet S side than the second plane P2, and the following expression (1) is satisfied. The angle formed by the first plane P1 and the second plane P2 on the mirror region T2 side and on the sheet S side and the angle formed by the first plane P1 and the third plane P3 on the light source region T1 side and on the LED-array light source 101 side are both an acute angle.

$$0° < \theta_W < \theta_R < 90° \quad (1)$$

In the illuminating device 100, the LED-array light source 101, the white reflecting surface 102, and the mirror surface 103 are arranged in the positional relations described above, and light distribution by the LED-array light source 101 and the white reflecting surface 102 (for example, reflectance of 70%, Lambertian diffusion) is as shown in FIG. 4. That is, when it is assumed that a direction of the optical axis of the LED-array light source 101 along the third plane P3 is 0°, and a normal direction of the third plane P3 is 90°, an output peak in the light distribution by the LED-array light source 101 and the white reflecting surface 102 is positioned near a range of from 10° to 20°.

Therefore, in the illuminating device 100, when the LED-array light source 101 and the white reflecting surface 102 are inclined so that the third plane P3 satisfies [0°<$\theta_W$<90°] with respect to the first plane P1, the light distribution by the LED-array light source 101 and the white reflecting surface 102 becomes as shown by a line A1 in FIG. 5. That is, when the LED-array light source 101 and the white reflecting surface 102 are inclined as described above, a quantity of light irradiated to the sheet S in the read range W by a combination of the LED-array light source 101 and the white reflecting surface 102 relatively increases, and a peak of illuminance can be shifted toward the center of the read range W in the sub-scanning direction, as compared to a case that the LED-array light source 101 and the white reflecting surface 102 are not inclined as shown by a line A2 in FIG. 5 (that is, $\theta_W$=0° and the first plane P1 and the third plane P3 are parallel with each other), and a case that the white reflecting surface 102 is not provided and only the LED-array light source 101 is inclined as shown by a line A3. Further, a quantity of light directly entering into the mirror surface 103 from the LED-array light source 101 also increases relatively.

The white reflecting surface 102 itself is the Lambertian surface in which the output peak is positioned in the normal direction of the third plane P3. On the other hand, because the mirror surface 103 is relatively inclined toward the sheet S side with respect to the white reflecting surface 102, so that the second plane P2 and the third plane P3 satisfy [$\theta_W$<$\theta_R$] with respect to the first plane P1, as shown in FIG. 6, the reflected light of the light from the normal direction of the third plane P3 on the mirror surface 103 is irradiated to the surface of the sheet S without fail, with an incident angle of $\pi/2-(2\theta_R-\theta_W)$ from the mirror surface 103 side. As a result, irradiation by the reflected light from the mirror surface 103 side can be increased. That is, a light increasing effect of the reflected light by the mirror surface 103 can be improved. As a result, the illuminance distribution in the sub-scanning direction can be stabilized.

FIG. 7 depicts illuminance distribution in the sub-scanning direction of the illuminating device and the image reading apparatus according to the first embodiment, where the sub-scanning direction is plotted on a horizontal axis, and relative illuminance is plotted on a vertical axis. In FIG. 7, a line B1 represents a case that the sheet S is directly irradiated only by the LED-array light source 101, and a line B2 represents a case that the sheet S is directly irradiated by the LED-array light source 101 and the white reflecting surface 102 by inclining the LED-array light source 101 and the white reflecting surface 102. A line B3 represents a case that components directly irradiated from the LED-array light source 101 to the mirror surface 103 are reflected by the mirror surface 103 to irradiate the sheet S. A line B4 represents a case that components from the LED-array light source 101 reflected by the white reflecting surface 102 and irradiated from the white reflecting surface 102 to the mirror surface 103 are reflected by the mirror surface 103 to irradiate the sheet S. A line B5 represents a case of adding the line B2 and the line B3, and a line B6 represents a case of adding the line B2, the line B3, and the line B4.

As is obvious from FIG. 7, in the case indicated by the line B2, the illuminance in the read range W relatively increases as compared to the case indicated by the line B1. In the case indicated by the line B3, the illuminance in the read range W on the mirror surface 103 side relatively increases as compared to the illuminance on the LED-array light source 101 side. In the case indicated by the line B4, the illuminance in the read range W on the mirror surface 103 side relatively increases as compared to the illuminance on the LED-array light source 101 side. Therefore, the illuminating device 100 (corresponding to the case indicated by the line B6 in FIG. 7) can increase the quantity of irradiation light in the entire read range W, while stabilizing (uniformizing) illuminance distribution in the sub-scanning direction, and can improve the illumination efficiency.

The illuminating device 100 includes the LED-array light source 101 that irradiates light toward the sheet S, in which a plurality of LEDs 107 are arranged and mounted on the mounting surface of the board 105, the white reflecting surface 102 arranged in a planar shape parallel to the optical axis of the LED-array light source 101 on a surface including the mounting surface 106 to reflect the light from the LED-array light source 101, and the mirror surface 103 formed in a planar shape to reflect the light from the LED-array light source 101 and the reflected light from the white reflecting surface 102. The surface including the optical axis of the lens 2 that images the reflected light from the sheet S and a row of pixels of the line sensor 3, in which a plurality of pixels that convert the reflected light from the sheet S imaged by the lens 2 to an electric signal, and read the image on the sheet S are arrayed in the main scanning direction, is designated as the first plane P1. The surface including the mirror surface 103 is designated as the second plane P2, and the surface including the white reflecting surface 102 is designated as the third plane P3. The region of space on one side where the LED-array light source 101 and the white reflecting surface 102 are arranged, designating the first plane P1 as a boundary, is designated as the light source region T1. The region of space on the other side where the mirror surface 103 is arranged, designating the first plane P1 as the boundary, is designated as the mirror region T2. The first angle formed by the first plane P1 and the second plane P2 on the mirror region T2 side and on the sheet S side is designated as $\theta_R$ and the second angle formed by the first plane P1 and the third plane P3 on the light source region T1 side and on the LED-array light source 101 side is designated as $\theta_W$. The LED-array light source 101, the white reflecting surface 102, and the mirror surface 103 are then arranged such that the third plane P3 crosses the first plane P1 on the sheet S side than the second plane P2, and $0°<\theta_W<\theta_R<90°$ is satisfied.

Further, the image reading apparatus 1 according to the first embodiment includes the illuminating device 100, the lens 2 that images the reflected light from the sheet S, and the line sensor 3 in which a plurality of pixels that convert the reflected light from the sheet S imaged by the lens 2 to an electric signal, and read the image on the sheet S are arrayed in the main scanning direction.

Therefore, according to the illuminating device 100 and the image reading apparatus 1, by arranging the LED-array light source 101, the white reflecting surface 102, and the mirror surface 103 in the predetermined positional relations described above, the quantity of irradiation light in the entire read range W can be increased, while stabilizing (uniformizing) illuminance distribution in the sub-scanning direction, and the illumination efficiency can be improved. Further, the illuminating device 100 and the image reading apparatus 1 can improve the illumination efficiency in a point that a loss of quantity of light due to transmittance of transparent optical components such as a cylindrical lens and diffuser panel decreases. In the illuminating device 100 and the image reading apparatus 1, because the LED-array light source 101 is arranged only on one side of the read range W in the sub-scanning direction, the entire apparatus can be downsized and the number of parts can be reduced, for example, as compared to a case that the LED-array light source is arranged on the opposite sides, thereby enabling to reduce a manufacturing cost. As a result, the illuminating device 100 and the image reading apparatus 1 can realize both downsizing of the device and illumination efficiency.

Further, in the illuminating device 100 and the image reading apparatus 1, the white reflecting surface 102 is formed of a white resist on the mounting surface 106 of the board 105. Therefore, because the white reflecting surface 102 is produced from a resist used for production of the board 105, an increase of cost required for producing the white reflecting surface 102 can be suppressed.

The illuminating device 100 and the image reading apparatus 1 further includes the casing 111 that accommodates the LED-array light source 101, the white reflecting surface 102, and the mirror surface 103 therein. In the casing 111, the light-source-side wall body 112 provided with the LED-array light source 101 and the white reflecting surface 102, the mirror-side wall body 113 provided with the mirror surface 103, and the connecting wall body 114 that connects the light-source-side wall body 112 and the mirror-side wall body 113 on a side opposite to the light irradiating side by the LED-array light source 101 are integrally formed. The connecting wall body 114 is provided with the opening 115 corresponding to the read range W in which the line sensor 3 can read the image on the sheet S in the sub-scanning direction, which is a range with a center in the sub-scanning direction orthogonal to the main scanning direction being positioned on the first plane P1. Therefore, according to the illuminating device 100 and the image reading apparatus 1, because the LED-array light source 101, the white reflecting surface 102, and the mirror surface 103 can be fixed to the same member by integrally forming the casing 111 including the light-source-side wall body 112, the mirror-side wall body 113, and the connecting wall body 114, the LED-array light source 101, the white reflecting surface 102, and the mirror surface 103 can be reliably fixed with appropriate positional relations and unitized. As a result, the illuminating device 100 and the image reading apparatus 1 can increase the quantity of irradiation light in the entire read range W, while stabilizing (uniformizing) illuminance distribution in the sub-scanning direction.

Figure 8:
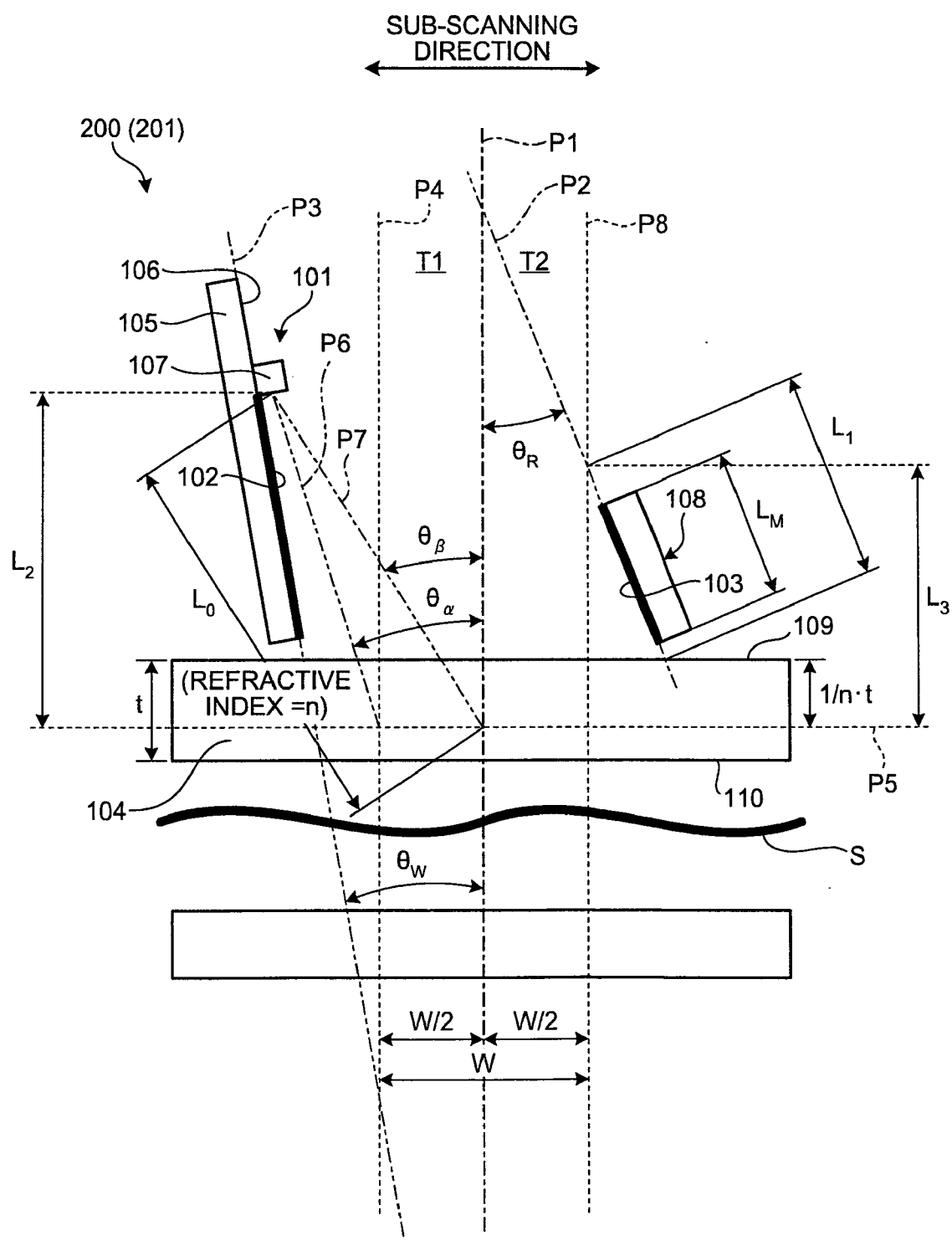
FIG. 8 is a schematic configuration diagram of a configuration of an illuminating device and an image reading apparatus according to a second embodiment of the present invention.
Figure 9:
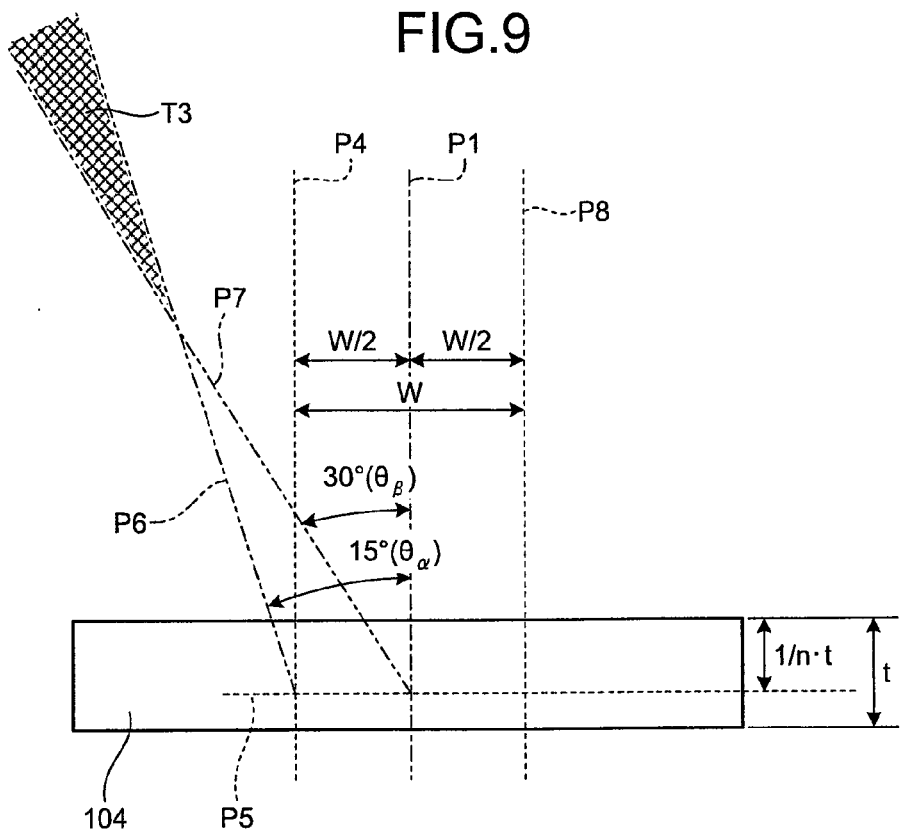
FIG. 9 is a schematic diagram for explaining a range in which an LED-array light source of the illuminating device and the image reading apparatus according to the second embodiment is arranged.
Figure 10:
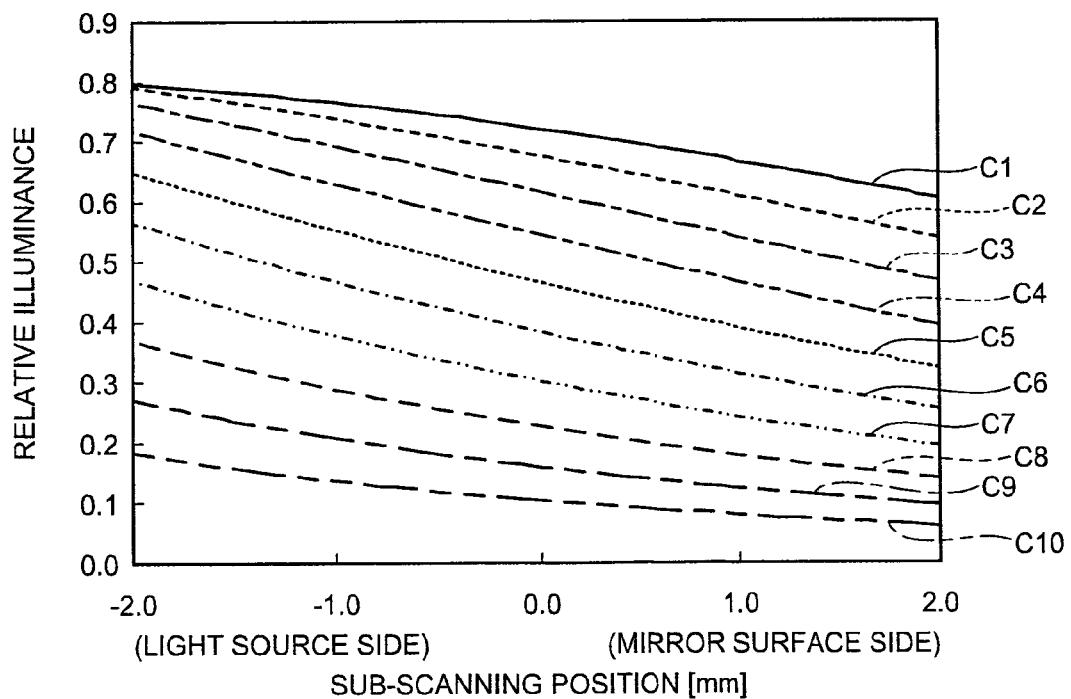
FIG. 10 is a schematic diagram for explaining illuminance distribution in a sub-scanning direction of the illuminating device and the image reading apparatus according to the second embodiment.
Figure 11:
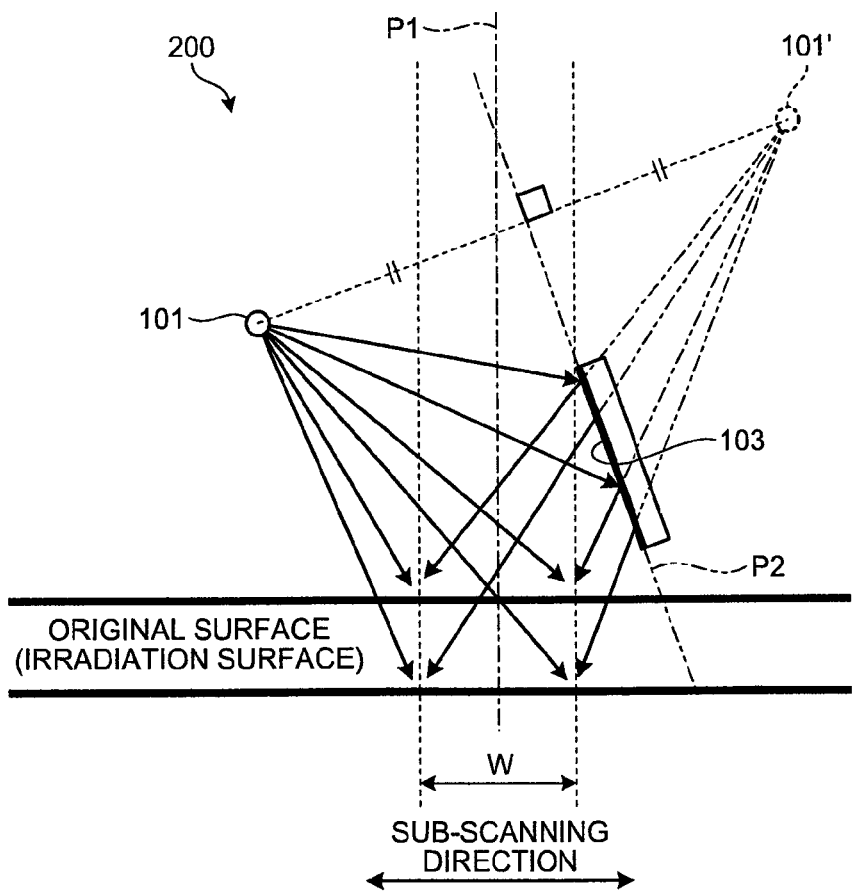
FIG. 11 is a schematic diagram of irradiation by the LED-array light source and irradiation by reflection on a mirror surface in the illuminating device and the image reading apparatus according to the second embodiment.
Figure 12:
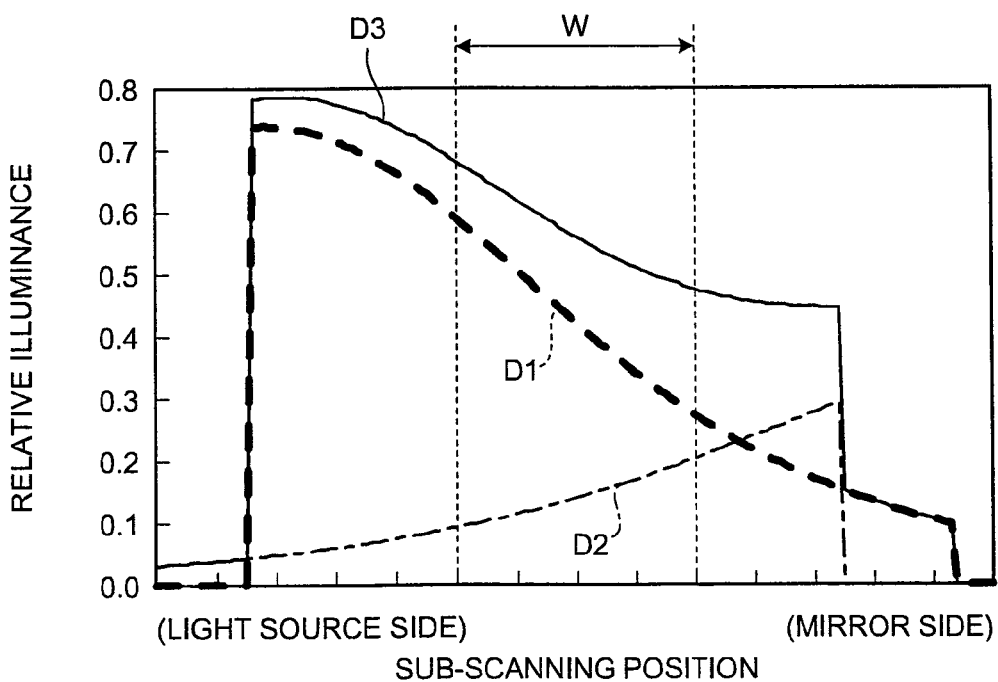
FIG. 12 is a schematic diagram for explaining details of illuminance distribution in the sub-scanning direction of the illuminating device and the image reading apparatus according to the second embodiment.
Figure 13:
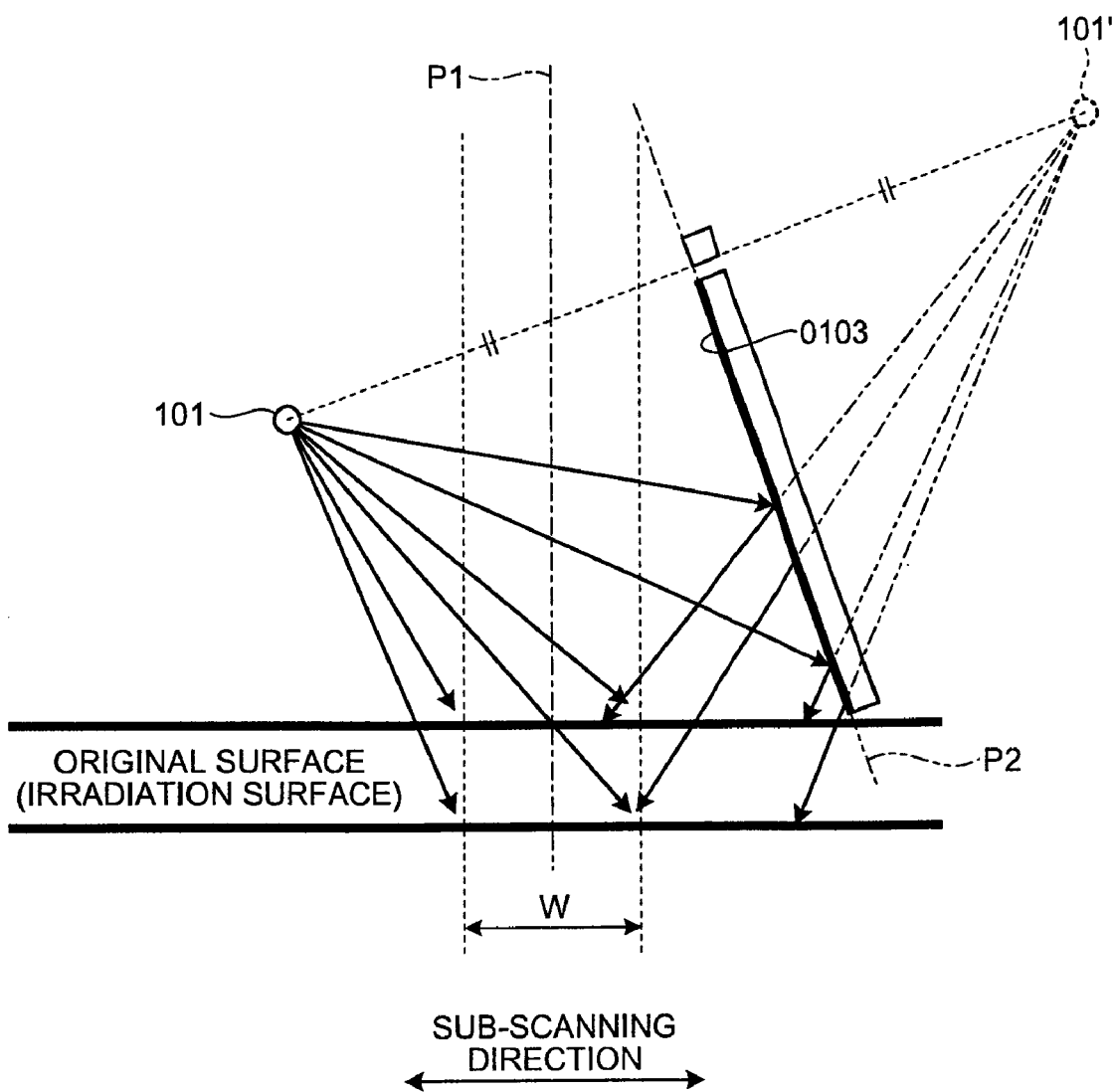
FIG. 13 is a schematic diagram of irradiation by an LED-array light source and irradiation by reflection on a mirror surface in an illuminating device according to a comparative example.
Figure 14:
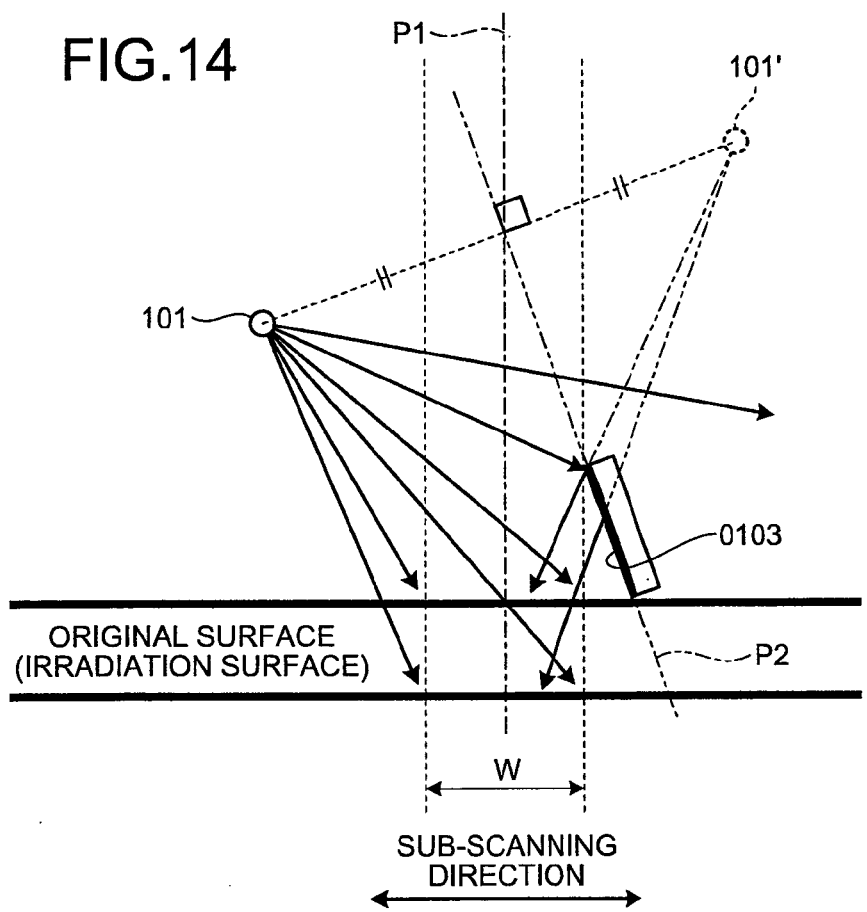
FIG. 14 is a schematic diagram of irradiation by the LED-array light source and irradiation by reflection on the mirror surface in the illuminating device according to the comparative example.

FIG. 8 is a schematic configuration diagram of a configuration of an illuminating device and an image reading apparatus according to a second embodiment of the present invention, FIG. 9 is a schematic diagram for explaining a range in which an LED-array light source of the illuminating device and the image reading apparatus according to the second embodiment is arranged, FIG. 10 is a schematic diagram for explaining illuminance distribution in a sub-scanning direction of the illuminating device and the image reading apparatus according to the second embodiment, FIG. 11 is a schematic diagram of irradiation by the LED-array light source and irradiation by reflection on a mirror surface in the illuminating device and the image reading apparatus according to the second embodiment, FIG. 12 is a schematic diagram for explaining details of illuminance distribution in the sub-scanning direction of the illuminating device and the image reading apparatus according to the second embodiment, and FIGS. 13 and 14 are schematic diagrams of irradiation by an LED-array light source and irradiation by reflection on a mirror surface in an illuminating device according to a comparative example of the present invention.

The illuminating device and the image reading apparatus according to the second embodiment have substantially the same configuration as that of the illuminating device and the image reading apparatus according to the first embodiment. However, it is different from the configuration of the illuminating device and the image reading apparatus according to the first embodiment in that the positional relations of the linear light source, the white reflecting surface, and the mirror surface are restricted in more detail. Constituent elements similar to those in the first embodiment are indicated by the same reference numerals and redundant explanations of configurations, operations, and effects of such components will not be repeated here.

As shown in FIG. 8, an image reading apparatus 201 according to the second embodiment includes an illuminating device 200. In the illuminating device 200 according to the second embodiment, the positional relations of the LED-array light source 101, the white reflecting surface 102, and the mirror surface 103 explained for the illuminating device 100 (see FIG. 1) according to the first embodiment are restricted in more detail.

First, to explain the positional relations of the LED-array light source 101, the white reflecting surface 102, and the mirror surface 103, preconditions described below are set in addition to the preconditions explained for the illuminating device 100 (see FIG. 1) according to the first embodiment.

A thickness of the glass plate 104 along a direction orthogonal to the surfaces 109 and 110 thereof, that is, along the direction of the optical axis of the lens 2 (see FIG. 1) is designated as t.

A refractive index of the glass plate 104 is designated as n.

A range in which a central position in a sub-scanning direction orthogonal to the main scanning direction is positioned on the first plane, which is a range in which the line sensor 3 can read the image of the sheet S in the sub-scanning direction, is designated as the read range W.

A plane including a boundary of the read range W on the LED-array light source 101 side and parallel to the first plane P1 is designated as a fourth plane P4.

A plane at a position of $(1-1/n) \cdot t$ from the surface 110 of the glass plate 104 on the sheet S side toward the LED-array light source 101 side, which is parallel to the surfaces 109 and 110 and orthogonal to the first plane P1 is designated as a fifth plane P5. The fifth plane P5 corresponds to a virtual irradiation surface (original surface) when the refractive index n of the glass plate 104 or the like is taken into consideration.

A plane including a line of intersection between the fourth plane P4 and the fifth plane P5 and a center of the LED-array light source 101 is designated as a sixth plane P6.

A plane including a line of intersection between the first plane P1 and the fifth plane P5 and the center of the LED-array light source 101 is designated as a seventh plane P7.

A plane including the boundary of the read range W on the mirror surface 103 side and parallel to the first plane P1 is designated as an eighth plane P8.

A third angle formed by the first plane P1 and the sixth plane P6 on the fourth plane P4 side and on the LED-array light source 101 side is designated as $\theta_\alpha$.

A fourth angle formed by the first plane P1 and the seventh plane P7 on the fourth plane P4 side and on the LED-array light source 101 side is designated as $\theta_\beta$.

A distance from the line of intersection between the first plane P1 and the fifth plane P5 to the center of the LED-array light source 101 is designated as $L_0$.

A distance from a line of intersection between the second plane P2 and the eighth plane P8 to a line of intersection between the second plane P2 and the surface 109 of the glass plate 104 on the LED-array light source 101 side is designated as $L_1$.

A length of the mirror surface 103 along a direction orthogonal to the line of intersection between the second plane P2 and the eighth plane P8 and the line of intersection between the second plane P2 and the surface 109 of the glass plate 104 on the LED-array light source 101 side is designated as $L_M$.

The LED-array light source 101, the white reflecting surface 102, and the mirror surface 103 are then arranged to satisfy the following expressions (2), (3), (4), (5), and (6) under preconditions set as described above.

$$15° \leq \theta_\alpha \quad (2)$$

$$30° \geq \theta_\beta \quad (3)$$

$$0.6 < L_1/L_0 \cdot \cos \theta_R / \cos \theta_\beta < 1.0 \quad (4)$$

$$10° \leq \theta_R \leq 30° \quad (5)$$

$$L_M \leq L_1 \quad (6)$$

In the illuminating device 200, the LED-array light source 101, the white reflecting surface 102, and the mirror surface 103 are arranged in the positional relations described above.

In the illuminating device 200, when the LED-array light source 101 is arranged such that the sixth plane P6 and the seventh plane P7 satisfy $[15° \leq \theta_\alpha]$ and $[30° \geq \theta_\beta]$, the LED-array light source 101 is arranged, as shown in FIG. 9, within an arrangement range T3 defined by the sixth plane P6 and the seventh plane P7 based on $[15° \leq \theta_\alpha]$ and $[30° \geq \theta_\beta]$.

Because the LED-array light source 101 is arranged within the arrangement range T3 defined according to $[15° \leq \theta_\alpha]$, for example, when the sheet S is glossy paper, it can be prevented that specular reflection components by the sheet S of the irradiation light from the LED-array light source 101 directly enter into the line sensor 3 due to an inclination of the sheet S. For example, when a normal to the sheet S has an inclination of angle $\theta_D$ with respect to the first plane P1, an angle of reflection increases by $2 \times \theta_D$. Generally, in a lens of minification optical system (optical system to form a reduced image) such as an office automation (OA) device, when it is assumed that an angle of entrance pupil as viewed from a certain point on an original (an aperture image as viewed from an object side) is $\theta_H$, a preferable condition is $2 \times \theta_D + \theta_H < \theta_\alpha$. For example, when it is assumed that $\theta_D = 5°$ and $\theta_H \leq 2°$, it is viewed that the above condition $[15° \leq \theta_\alpha]$ is satisfied. The incident angle from the LED-array light source 101 is $\theta_\alpha$ in the entire range of the surface 109 on the LED-array light source 101 side and the surface 110 on the sheet S side of the glass plate 104 in the read range W.

Further, because the LED-array light source 101 is arranged within the arrangement range T3 defined according to $[30° \geq \theta_\beta]$, predetermined illumination efficiency (light quantity) can be ensured.

FIG. 10 depicts relative illuminance in the sub-scanning direction of the irradiation light irradiated directly to the original surface from the LED-array light source 101, when $\theta_\beta$ is changed with 5° interval between $15° \leq \theta_\beta \leq 60°$, assuming that $L_0 = 15$ mm and $W/2 = 2.0$ mm. In FIG. 10, a line C1 represents a case of $\theta_\beta$ being 15°, a line C2 represents a case of $\theta_\beta$ being 20°, a line C3 represents a case of $\theta_\beta$ being 25°, a line C4 represents a case of $\theta_\beta$ being 30°, a line C5 represents a case of $\theta_\beta$ being 35°, a line C6 represents a case of $\theta_\beta$ being 40°, a line C7 represents a case of $\theta_\beta$ being 45°, a line C8 represents a case of $\theta_\beta$ being 50°, a line C9 represents a case of $\theta_\beta$ being 55°, and a line C10 represents a case of $\theta_\beta$ being 60°. As is obvious from FIG. 10, the light quantity of the irradiation light irradiated directly to the original surface from the LED-array light source 101 relatively decreases as $\theta_\beta$ increases, and relatively increases as $\theta_\beta$ decreases. In the second embodiment, $\theta_\beta$ is set to $[30° \geq \theta_\beta]$, taking into consideration ensuring of sufficient illumination efficiency (light quantity) of the LED-array light source 101 and the read range W of the line sensor 3 in the sub-scanning direction.

Because the illuminating device 200 is arranged such that the mirror surface 103 satisfies $[0.6 < L_1/L_0 \cdot \cos \theta_R/\cos \theta_\beta < 1.0]$, $[10° \leq \theta_R \leq 30°]$, and $[L_M \leq L_1]$, the mirror surface 103 can be arranged at an appropriate position with respect to the LED-array light source 101 arranged within the arrangement range T3. In other words, when the LED-array light source 101 is arranged within the arrangement range T3, the mirror surface 103 works effectively in the case that the length $L_M$ of the mirror surface 103 and the first angle $\theta_R$ formed by the first plane P1 and the second plane P2 are in the range of $[0.6 < L_1/L_0 \cdot \cos \theta_R/\cos \theta_\beta < 1.0]$, $[10° \leq \theta_R \leq 30°]$, and $[L_M \leq L_1]$. That is, when the LED-array light source 101 is arranged within the arrangement range T3, the length $L_M$ of the mirror surface 103 and the first angle $\theta_R$ formed by the first plane P1 and the second plane P2 satisfy [$0.6<L_1/L_0\cdot\cos\theta_R/\cos\theta_\beta<1.0$], [$10°\leq\theta_R\leq30°$], and [$L_M\leq L_1$], thereby enabling to increase the quantity of irradiation light in the entire read range W, while appropriately stabilizing (uniformizing) illuminance distribution in the sub-scanning direction, and improve the illumination efficiency. When it is assumed that $t\ll L_0$ and $L_M=L_1$, $L_0\cdot\cos\theta_\beta$, which is a denomination in the expression (4), corresponds to a height $L_2$ of the light source from the fifth plane P5 to the center of the LED-array light source 101 along the direction of the optical axis of the lens 2 (see FIG. 1), and $L_1\cdot\cos\theta_R$, which is a numerator in the expression (4), corresponds to a height $L_3$ of the mirror surface from the fifth plane P5 to an upper end of the mirror surface 103 (an end on the side away from the fifth plane P5) along the direction of the optical axis of the lens 2 (see FIG. 1).

FIG. 11 is a schematic diagram of direct irradiation by the LED-array light source 101 and irradiation by reflection on the mirror surface 103, when the LED-array light source 101 is arranged within the arrangement range T3, and the mirror surface 103 is arranged such that the length $L_M$ of the mirror surface 103 and the first angle $\theta_R$ formed by the first plane P1 and the second plane P2 are in the range of [$0.6<L_1/L_0\cdot\cos\theta_R/\cos\theta_\beta<1.0$], [$10°\leq\theta_R\leq30°$], and [$L_M\leq L_1$].

As shown in FIG. 11, on the mirror surface 103, a virtual image 101' of the LED-array light source 101 is positioned at a plane-symmetric position based on the second plane P2 with respect to the position of the LED-array light source 101. In the illuminating device 200, therefore, the read range W (that is, the sheet S) is irradiated by a diffused light source from opposite sides of the first plane P1, by direct irradiation by the LED-array light source 101 and irradiation by reflection on the mirror surface 103.

FIG. 12 is a schematic diagram for explaining details of illuminance distribution in the sub-scanning direction of the illuminating device and the image reading apparatus according to the second embodiment, where the sub-scanning direction is plotted on a horizontal axis, and relative illuminance is plotted on a vertical axis. In FIG. 12, a line D1 represents illuminance distribution in the sub-scanning direction in direct irradiation by the LED-array light source 101, a line D2 represents illuminance distribution in the sub-scanning direction in irradiation by reflection on the mirror surface 103, and a line D3 represents illuminance distribution in the sub-scanning direction in irradiation totaling direct irradiation by the LED-array light source 101 and irradiation by reflection on the mirror surface 103. As is obvious from FIG. 12, in the case of the line D1, irradiation on the LED-array light source 101 side in the read range W relatively increases as compared to irradiation on the mirror surface 103 side. In the case of the line D2, irradiation on the mirror surface 103 side in the read range W relatively increases as compared to irradiation on the LED-array light source 101 side. As a result, in the case of the line D3 totaling direct irradiation by the LED-array light source 101 and irradiation by reflection on the mirror surface 103, a gradient thereof relatively decreases as compared to the case of the line D1. That is, the quantity of irradiation light in the entire read range W increases, while stabilizing (uniformizing) illuminance distribution in the sub-scanning direction.

FIGS. 13 and 14 schematically depict irradiation by the LED-array light source and irradiation by reflection on the mirror surface in the illuminating device according to the comparative example. FIG. 13 depicts a case that a mirror surface 0103 is arranged to satisfy [$1.0\leq L_1/L_0\cdot\cos\theta_R/\cos\theta_\beta$] (that is, when the height $L_3$ of the mirror surface is too high with respect the height $L_2$ of the light source), and FIG. 14 depicts a case that the mirror surface 0103 is arranged to satisfy [$L_1/L_0\cdot\cos\theta_R/\cos\theta_\beta<0.6$] (that is, when the height $L_3$ of the mirror surface is too low with respect the height $L_2$ of the light source). As is obvious from these drawings, in the case of the comparative example shown in FIGS. 13 and 14, there is a tendency such that the illumination distribution in the sub-scanning direction becomes uneven. That is, it is shown that there is an appropriate value of a predetermined range in $L_1/L_0\cdot\cos\theta_R/\cos\theta_\beta$, in other words, in the height $L_3$ of the mirror surface with respect the height $L_2$ of the light source. That is, it is shown that the range of [$0.6<L_1/L_0\cdot\cos\theta_R/\cos\theta_\beta<1.0$] is appropriate.

According to the illuminating device 200 and the image reading apparatus 201 of the second embodiment explained above, the glass plate 104 formed of a plate-like transparent material and arranged between the LED-array light source 101 and the sheet S is provided so that the surface 109 on the LED-array light source 101 side and the surface 110 on the sheet S side are orthogonal to the first plane P1. The thickness of the glass plate 104 along the direction orthogonal to the surfaces 109 and 110 is designated as t. The refractive index of the glass plate 104 is designated as n. The range in which the central position in the sub-scanning direction orthogonal to the main scanning direction is positioned on the first plane, which is the range in which the line sensor 3 can read the image of the sheet S in the sub-scanning direction, is designated as the read range W. The plane parallel to the first plane P1 and including the boundary of the read range W on the LED-array light source 101 side is designated as the fourth plane P4. The plane at a position of $(1-1/n)\cdot t$ from the surface 110 of the glass plate 104 on the sheet S side toward the LED-array light source 101 side, which is parallel to the surface 110 and orthogonal to the first plane P1 is designated as the fifth plane P5. The plane including the line of intersection between the fourth plane P4 and the fifth plane P5 and the center of LED-array light source 101 is designated as the sixth plane P6. The plane including the line of intersection between the first plane P1 and the fifth plane P5 and the center of LED-array light source 101 is designated as the seventh plane P7. The plane including the boundary of the read range W on the mirror surface 103 side and parallel to the first plane P1 is designated as the eighth plane P8. The third angle formed by the first plane P1 and the sixth plane P6 on the fourth plane P4 side and on the LED-array light source 101 side is designated as $\theta_\alpha$. The fourth angle formed by the first plane P1 and the seventh plane P7 on the fourth plane P4 side and on the LED-array light source 101 side is designated as $\theta_\beta$. The distance from the line of intersection between the first plane P1 and the fifth plane P5 to the center of the LED-array light source 101 is designated as $L_0$. The distance from the line of intersection between the second plane P2 and the eighth plane P8 to the line of intersection between the second plane P2 and the surface 109 of the glass plate 104 on the LED-array light source 101 side is designated as $L_1$. The length of the mirror surface 103 along the direction orthogonal to the line of intersection between the second plane P2 and the eighth plane P8 and the line of intersection between the second plane P2 and the surface 109 of the glass plate 104 on the LED-array light source 101 side is designated as $L_M$. The LED-array light source 101, the white reflecting surface 102, and the mirror surface 103 are then arranged to satisfy $15°\leq\theta_\alpha$, $30°\geq\theta_\beta$, $0.6<L_1/L_0\cdot\cos\theta_R/\cos\theta_\beta<1.0$, $10°\leq\theta_R\leq30°$, and $L_M\leq L_1$.

Accordingly, because the LED-array light source 101, the white reflecting surface 102, and the mirror surface 103 are arranged to satisfy $15°\leq\theta_\alpha$, $30°\geq\theta_\beta$, $0.6<L_1/L_0\cdot\cos\theta_R/\cos\theta_\beta<1.0$, $10°\leq\theta_R\leq30°$, and $L_M\leq L_1$, the illuminating device 200 and the image reading apparatus 201 can further increase the quantity of irradiation light in the entire read range W, while stabilizing (uniformizing) illuminance distribution in the sub-scanning direction, and can ensure a deep illumination depth. Because the deep illumination depth can be ensured, according to the illuminating device 200 and the image reading apparatus 201, when the distance from the surface 110 of the glass plate 104 to the surface of the sheet S is designated as "original height", the original height at which sufficient illuminance (light quantity) can be ensured by an original surface (irradiation plane) can be made relatively high. That is, a decrease in the light quantity with respect to a side where the original height becomes high, that is, illuminance attenuation can be reduced.

Figure 15:
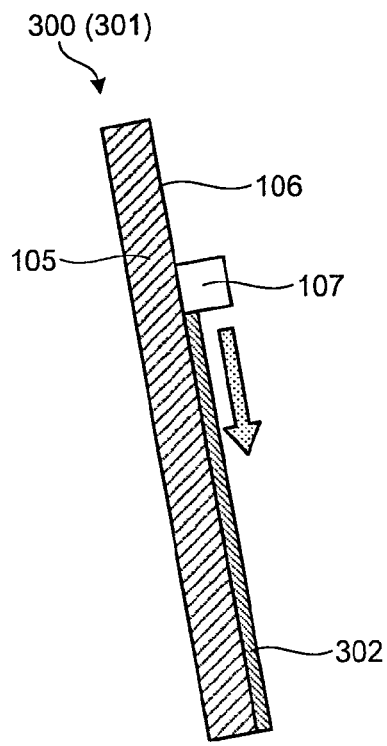
FIG. 15 is a schematic sectional view for explaining a white reflecting surface provided in an illuminating device and an image reading apparatus according to a third embodiment of the present invention.

FIG. 15 is a schematic sectional view of a white reflecting surface provided in an illuminating device and an image reading apparatus according to a third embodiment of the present invention. The illuminating device and the image reading apparatus according to the third embodiment have substantially the same configuration as that of the illuminating device and the image reading apparatus according to the first embodiment. However, the configuration of the white reflecting surface is different from that of the white reflecting surface in the illuminating device and the image reading apparatus according to the first embodiment. Constituent elements similar to those in the above embodiments are indicated by the same reference numerals and redundant explanations of configurations, operations, and effects of such components will not be repeated here.

As shown in FIG. 15, an image reading apparatus 301 according to the third embodiment includes an illuminating device 300, and the illuminating device 300 includes a white reflecting surface 302.

The white reflecting surface 302 according to the third embodiment is formed of a white reflecting sheet material made of a resin, for example, a white reflecting sheet material made of a resin used in an application of a backlight for an LCD (liquid crystal display) television, provided on the mounting surface 106 of the board 105. When the white reflecting sheet material is used as the white reflecting surface 302, the white reflecting surface 302 can ensure a reflectance of, for example, 90% or higher, because the white reflecting sheet material made of the resin has high diffuseness. That is, as explained in the first embodiment, when the white reflecting surface 102 (see FIG. 2) is formed of the white resist on the mounting surface 106, because a general white resist has a reflectance of 60% to 70%, the white reflecting surface 302 according to the third embodiment can improve the reflectance relatively as compared to the white reflecting surface 102 (see FIG. 2) according to the first embodiment.

According to the illuminating device 300 and the image reading apparatus 301 according to the third embodiment, because the white reflecting surface 302 is formed of the white reflecting sheet material made of the resin provided on the mounting surface 106 of the board 105, a relatively high reflectance can be ensured. Accordingly, the illuminating device 300 and the image reading apparatus 301 can further increase the quantity of irradiation light in the entire read range W, while stabilizing (uniformizing) illuminance distribution in the sub-scanning direction.

Figure 16:
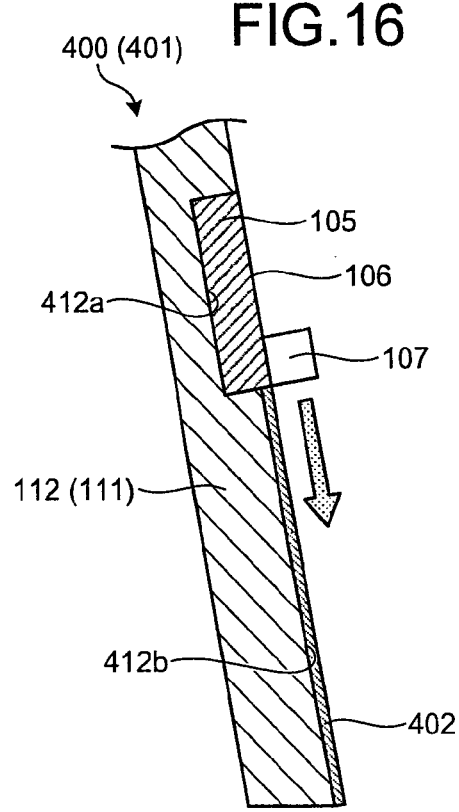
FIG. 16 is a schematic sectional view for explaining a white reflecting surface provided in an illuminating device and an image reading apparatus according to a fourth embodiment of the present invention.

FIG. 16 is a schematic sectional view of a white reflecting surface provided in an illuminating device and an image reading apparatus according to a fourth embodiment of the present invention. The illuminating device and the image reading apparatus according to the fourth embodiment have substantially the same configuration as that of the illuminating device and the image reading apparatus according to the first embodiment. However, the configuration of the white reflecting surface is different from that of the white reflecting surface in the illuminating device and the image reading apparatus according to the first embodiment. Constituent elements similar to those in the above embodiments are indicated by the same reference numerals and redundant explanations of configurations, operations, and effects of such components will not be repeated here.

As shown in FIG. 16, an image reading apparatus 401 according to the fourth embodiment includes an illuminating device 400, and the illuminating device 400 includes a white reflecting surface 402.

The white reflecting surface 402 is formed of a white reflecting sheet material made of a resin as in the white reflecting surface 302 (see FIG. 15) according to the third embodiment.

The light-source-side wall body 112 according to the fourth embodiment has a board installation groove 412a and a sheet installation groove 412b. The board installation groove 412a and the sheet installation groove 412b are both formed as a rectangularly depressed groove on the light-source-side wall body 112.

In the board installation groove 412a, a groove depth along a normal direction to a surface of the light-source-side wall body 112 where the board installation groove 412a is provided is set to a depth substantially equal to a thickness of the board 105. The board 105 is provided in the board installation groove 412a on the light-source-side wall body 112. Therefore, the surface of the board 105 and the surface of the light-source-side wall body 112 are located on the same plane, that is, are flush with each other.

The sheet installation groove 412b is formed continuously with the board installation groove 412a. The sheet installation groove 412b is formed continuously with the board installation groove 412a on a light irradiating side by the LED-array light source 101. In the sheet installation groove 412b, a groove depth along the normal direction to the surface of the light-source-side wall body 112 where the sheet installation groove 412b is provided is set to a depth substantially equal to a thickness of the white reflecting sheet material forming the white reflecting surface 402. The white reflecting sheet material forming the white reflecting surface 402 is provided in the sheet installation groove 412b on the light-source-side wall body 112. Therefore, the surface of the white reflecting sheet material forming the white reflecting surface 402 and the surface of the light-source-side wall body 112 are located on the same plane, that is, are flush with each other. That is, the surface of the white reflecting surface 402 (diffuse reflecting surface) is provided on a surface including the mounting surface 106, that is, is flush with the mounting surface 106.

The depth of the sheet installation groove 412b can be set to a depth substantially equal to a depth obtained by adding the thickness of the white reflecting sheet material forming the white reflecting surface 402 and a thickness of an adhesive for bonding the white reflecting sheet material to a bottom of the sheet installation groove 412b. In this case, the surface of the white reflecting surface 402 (diffuse reflecting surface) and the mounting surface 106 can be made flush with each other more accurately.

According to the illuminating device 400 and the image reading apparatus 401 according to the fourth embodiment, the board 105 is provided in the board installation groove 412a on the light-source-side wall body 112 having the board installation groove 412a, with the depth thereof being set to a depth substantially equal to the thickness of the board 105. The white reflecting surface 402 is formed of the white reflecting sheet material made of the resin provided in the sheet installation groove 412b formed continuously with the board installation groove 412a on the light irradiating side by the LED-array light source 101 on the light-source-side wall body 112, and the depth of the sheet installation groove 412b is set to a depth substantially equal to the thickness of the white reflecting sheet material made of the resin forming the white reflecting surface 402. Therefore, because the surface of the white reflecting surface 402 (diffuse reflecting surface) and the mounting surface 106 can be made flush with each other, it can be prevented that a part of the irradiation light from the LED-array light source 101 is blocked by an end face of the white reflecting sheet material forming the white reflecting surface 402. Accordingly, the irradiation light from the LED-array light source 101 can be effectively reflected by the white reflecting surface 402. As a result, the illuminating device 400 and the image reading apparatus 401 can further increase the quantity of irradiation light in the entire read range W, while stabilizing (uniformizing) illuminance distribution in the sub-scanning direction.

For example, even when the sheet installation groove 412b is not provided on the light-source-side wall body 112, and the white reflecting surface is formed by applying a white coating to a portion continuous with the board installation groove 412a on the light irradiating side by the LED-array light source 101 on the light-source-side wall body 112, the surface of the white reflecting surface 402 (diffuse reflecting surface) and the mounting surface 106 can be made flush with each other, and the quantity of irradiation light in the entire read range W can be further increased, while stabilizing (uniformizing) illuminance distribution in the sub-scanning direction.

Figure 17:
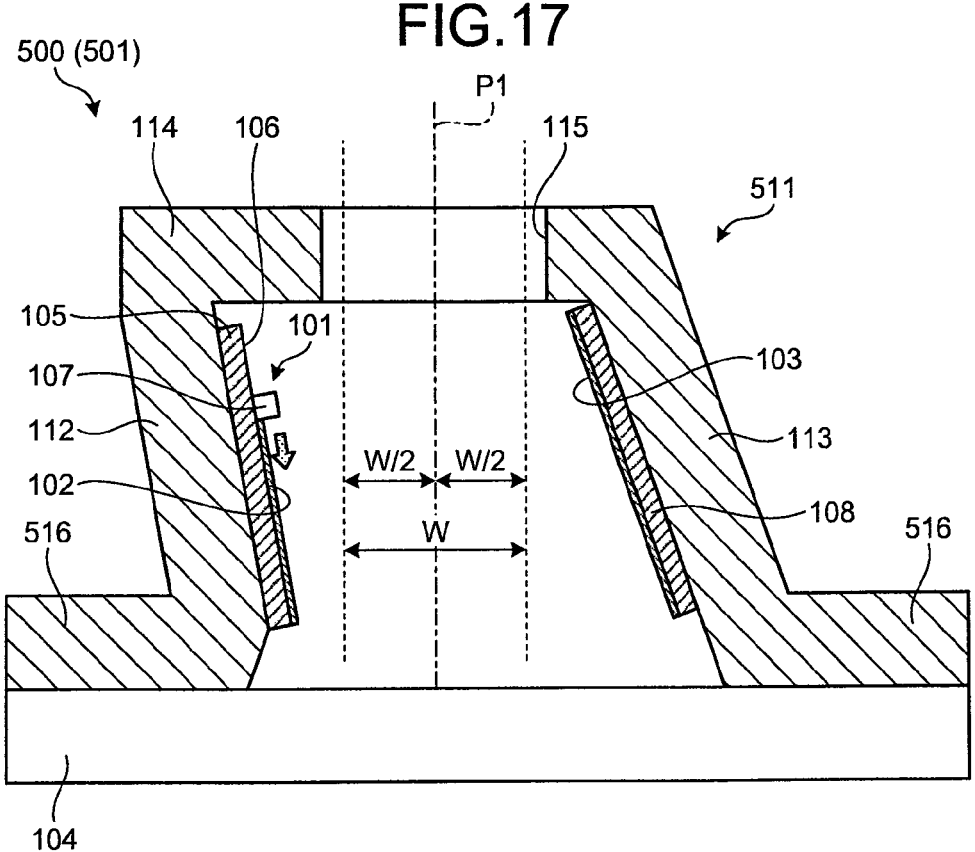
FIG. 17 is a schematic sectional view for explaining a casing provided in an illuminating device and an image reading apparatus according to a fifth embodiment of the present invention.

FIG. 17 is a schematic sectional view for explaining a casing provided in an illuminating device and an image reading apparatus according to a fifth embodiment of the present invention. The illuminating device and the image reading apparatus according to the fifth embodiment have substantially the same configuration as that of the illuminating device and the image reading apparatus according to the first embodiment. However, the configuration of the casing is different from that of the casing in the illuminating device and the image reading apparatus according to the first embodiment. Constituent elements similar to those in the above embodiments are indicated by the same reference numerals and redundant explanations of configurations, operations, and effects of such components will not be repeated here.

As shown in FIG. 17, an image reading apparatus 501 according to the fifth embodiment includes an illuminating device 500, and the illuminating device 500 includes a casing 511.

The casing according to the fifth embodiment includes a fitting portion 516 in addition to the light-source-side wall body 112, the mirror-side wall body 113, the connecting wall body 114, and the end-face wall body (not shown).

The fitting portion 516 is provided respectively to the light-source-side wall body 112 and the mirror-side wall body 113. The fitting portion 516 is respectively provided at an end portion of the light-source-side wall body 112 and the mirror-side wall body 113 on the light irradiating side by the LED-array light source 101. The fitting portion 516 is integrally formed with the light-source-side wall body 112 and the mirror-side wall body 113 in a rectangular plate-like shape extending along the main scanning direction.

The glass plate 104 is fitted to the fitting portion 516 provided on the light-source-side wall body 112 and the mirror-side wall body 113.

According to the illuminating device 500 and the image reading apparatus 501 according to the fifth embodiment, the light-source-side wall body 112 and the mirror-side wall body 113 have the fitting portion 516 for the glass plate 104 arranged between the LED-array light source 101 and the sheet S, at an end on the light irradiating side by the LED-array light source 101. Therefore, because the glass plate 104 is fitted to the fitting portion 516 of the casing 511 in which the light-source-side wall body 112, the mirror-side wall body 113, and the connecting wall body 114 are integrally formed, the glass plate 104 can be fixed to the same member, in addition to the LED-array light source 101, the white reflecting surface 102, and the mirror surface 103. Accordingly, the positional relations thereof can be reliably fixed with appropriate positional relations, and unitized. As a result, the illuminating device 500 and the image reading apparatus 501 can increase the quantity of irradiation light in the entire read range W, while stabilizing (uniformizing) illuminance distribution in the sub-scanning direction.

The fitting portion for the glass plate 104 can be also provided to the end-face wall body (not shown) to reliably fix four sides of the glass plate 104, thereby enabling to improve dust-proof capability of the casing 511. Accordingly, for example, it can be prevented that dust such as paper dust attaches to the glass plate 104. As a result, it can be reliably prevented that perpendicular lines are generated due to the dust or the like in the image read by the line sensor 3.

Figure 18:
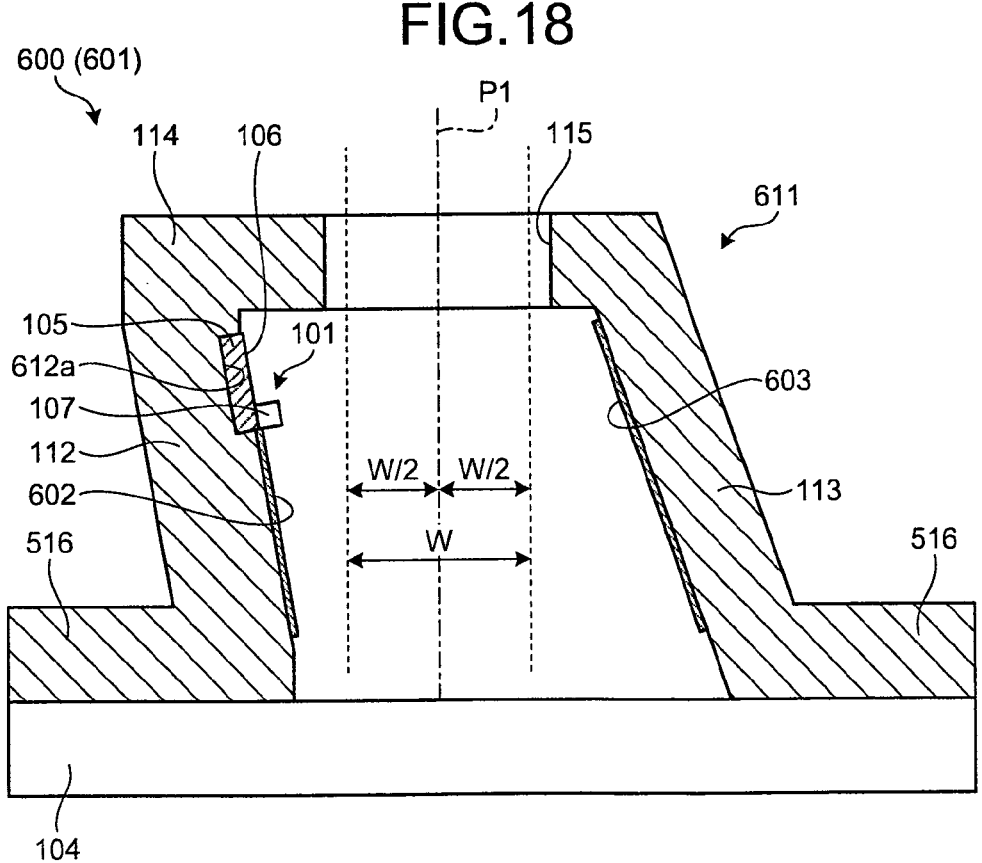
FIG. 18 is a schematic sectional view for explaining a casing provided in an illuminating device and an image reading apparatus according to a sixth embodiment of the present invention.

FIG. 18 is a schematic sectional view for explaining a casing provided in an illuminating device and an image reading apparatus according to a sixth embodiment of the present invention. The illuminating device and the image reading apparatus according to the sixth embodiment have substantially the same configuration as that of the illuminating device and the image reading apparatus according to the fifth embodiment. However, the configuration of the white reflecting surface and the mirror surface is different from that of the casing in the illuminating device and the image reading apparatus according to the fifth embodiment. Constituent elements similar to those in the above embodiments are indicated by the same reference numerals and redundant explanations of configurations, operations, and effects of such components will not be repeated here.

As shown in FIG. 18, an image reading apparatus 601 according to the sixth embodiment includes an illuminating device 600, and the illuminating device 600 includes a white reflecting surface 602 and a mirror surface 603.

A casing 611 provided in the illuminating device 600 according to the sixth embodiment is provided with a board installation groove 612a on the light-source-side wall body 112, as in the casing 111 according to the fourth embodiment. The board 105 is provided in the board installation groove 612a on the light-source-side wall body 112.

The white reflecting surface 602 is formed of a white reflecting sheet material made of a resin provided in a portion continuous with the board installation groove 612a on the light irradiating side by the LED-array light source 101 on the light-source-side wall body 112.

The mirror surface 603 is formed of a mirror sheet material obtained by depositing a metal on a resin member. The mirror sheet material forming the mirror surface 603 is provided on the mirror-side wall body 113.

According to the illuminating device 600 and the image reading apparatus 601 according to the sixth embodiment, the white reflecting surface 602 is formed of the white reflecting sheet material made of the resin provided in the portion continuous with the board installation groove 612a on the light irradiating side by the LED-array light source 101 on the light-source-side wall body 112, and the mirror surface 603 is formed of the mirror sheet material obtained by depositing the metal on the resin member. Therefore, a thickness of a portion where the mirror surface 603 is formed can be made thinner than, for example, a case that the mirror surface 103 is provided on the surface of the rectangular plate-like mirror member 108 as in the first embodiment, thereby enabling to further downsize the entire illuminating device 600 and the image reading apparatus 601.

Figure 19:
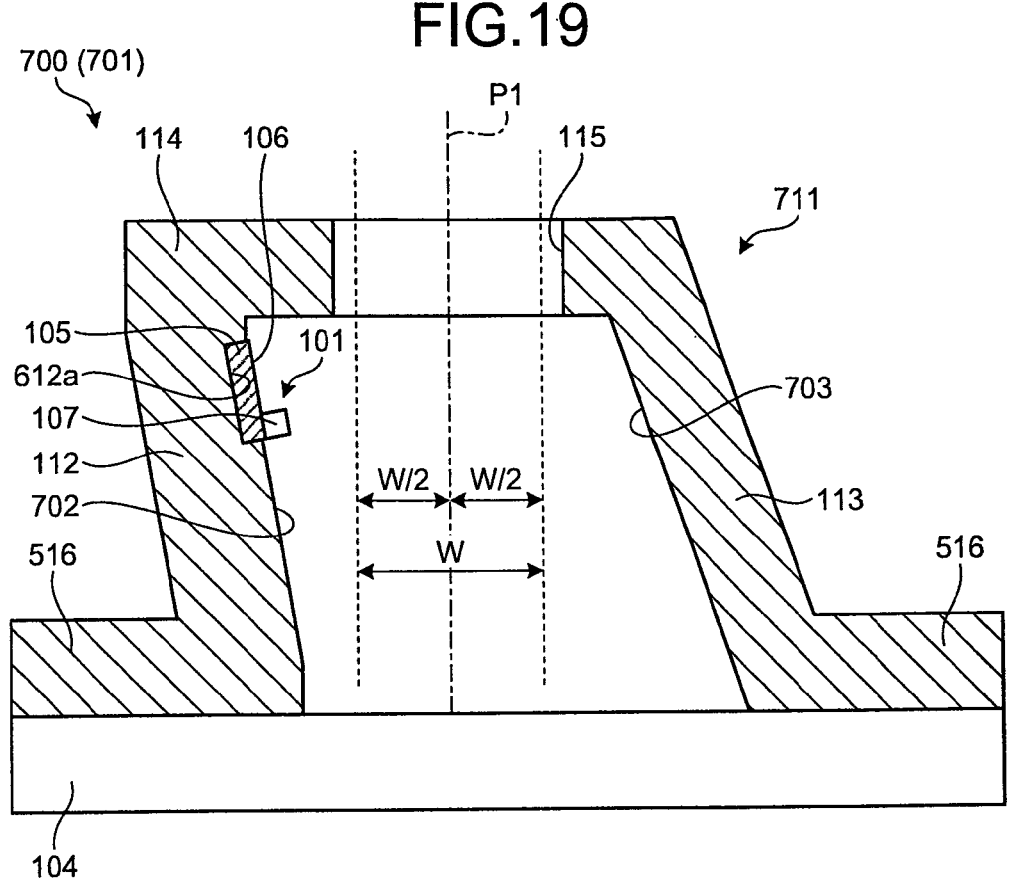
FIG. 19 is a schematic sectional view for explaining a casing provided in an illuminating device and an image reading apparatus according to a seventh embodiment of the present invention.

FIG. 19 is a schematic sectional view of a casing provided in an illuminating device and an image reading apparatus according to a seventh embodiment of the present invention. The illuminating device and the image reading apparatus according to the seventh embodiment have substantially the same configuration as that of the illuminating device and the image reading apparatus according to the sixth embodiment. However, the configuration of the white reflecting surface, the mirror surface, and the casing is different from that of the white reflecting surface, the mirror surface, and the casing in the illuminating device and the image reading apparatus according to the sixth embodiment. Constituent elements similar to those in the above embodiments are indicated by the same reference numerals and redundant explanations of configurations, operations, and effects of such components will not be repeated here.

As shown in FIG. 19, an image reading apparatus 701 according to the seventh embodiment includes an illuminating device 700, and the illuminating device 700 includes a white reflecting surface 702, a mirror surface 703, and a casing 711.

The casing 711 according to the seventh embodiment is obtained by integrally forming the light-source-side wall body 112, the mirror-side wall body 113, the connecting wall body 114, the end-face wall body (not shown), and the fitting portion 516 by a white resin material.

The white reflecting surface 702 according to the seventh embodiment is formed by the light-source-side wall body 112. That is, for the white reflecting surface 702, the surface of the light-source-side wall body 112 made of the white resin is directly used as the diffusion reflecting surface.

The mirror surface 703 according to the seventh embodiment is formed by directly depositing a metal on the mirror-side wall body 113.

The illuminating device 700 and the image reading apparatus 701 according to the seventh embodiment includes the casing 711 that accommodates the LED-array light source 101, the white reflecting surface 102, and the mirror surface 103 therein. In the casing 711, the light-source-side wall body 112 provided with the LED-array light source 101, the mirror-side wall body 113 provided with the mirror surface 703, and the connecting wall body 114 that connects the light-source-side wall body 112 and the mirror-side wall body 113 on the side opposite to the light irradiating side by the LED-array light source 101 are integrally formed by the white resin material. The connecting wall body 114 is provided with the opening 115 corresponding to the read range W in which the line sensor 3 can read the image on the sheet S in the sub-scanning direction, which is a range with the center in the sub-scanning direction orthogonal to the main scanning direction being positioned on the first plane P1. The white reflecting surface 702 is formed by the light-source-side wall body 112, and the mirror surface 703 is formed by depositing the metal on the mirror-side wall body 113. Therefore, because the parts other than the board 105 and the glass plate 104 are integrally formed, the number of parts can be further reduced, thereby enabling to further reduce the production cost, and further downsize the entire device.

The illuminating device and the image reading apparatus according to the present invention are not limited to the above embodiments, and various modifications can be made within the scope of the appended claims. The illuminating device and the image reading apparatus according to the present invention can be configured by combining two or more embodiments described above.

In the above explanations, the light-source-side wall body, the mirror-side wall body, and the connecting wall body of the casing are all integrally formed. However, these may not be integrally formed, so long as the positional relations of the linear light source, the white reflecting surface, and the mirror surface can be appropriately fixed.

Figure 20:
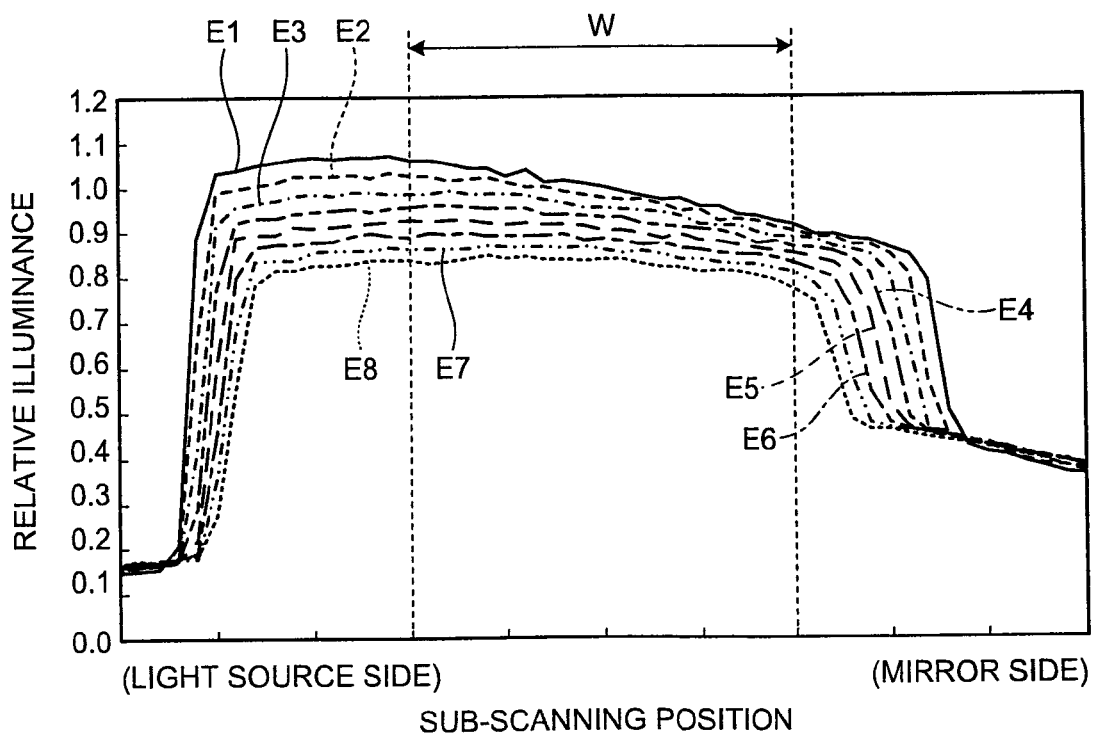
FIG. 20 depicts illuminance distribution in a sub-scanning direction corresponding to an original height in an illuminating device and an image reading apparatus according to an example of the present invention.
Figure 21:
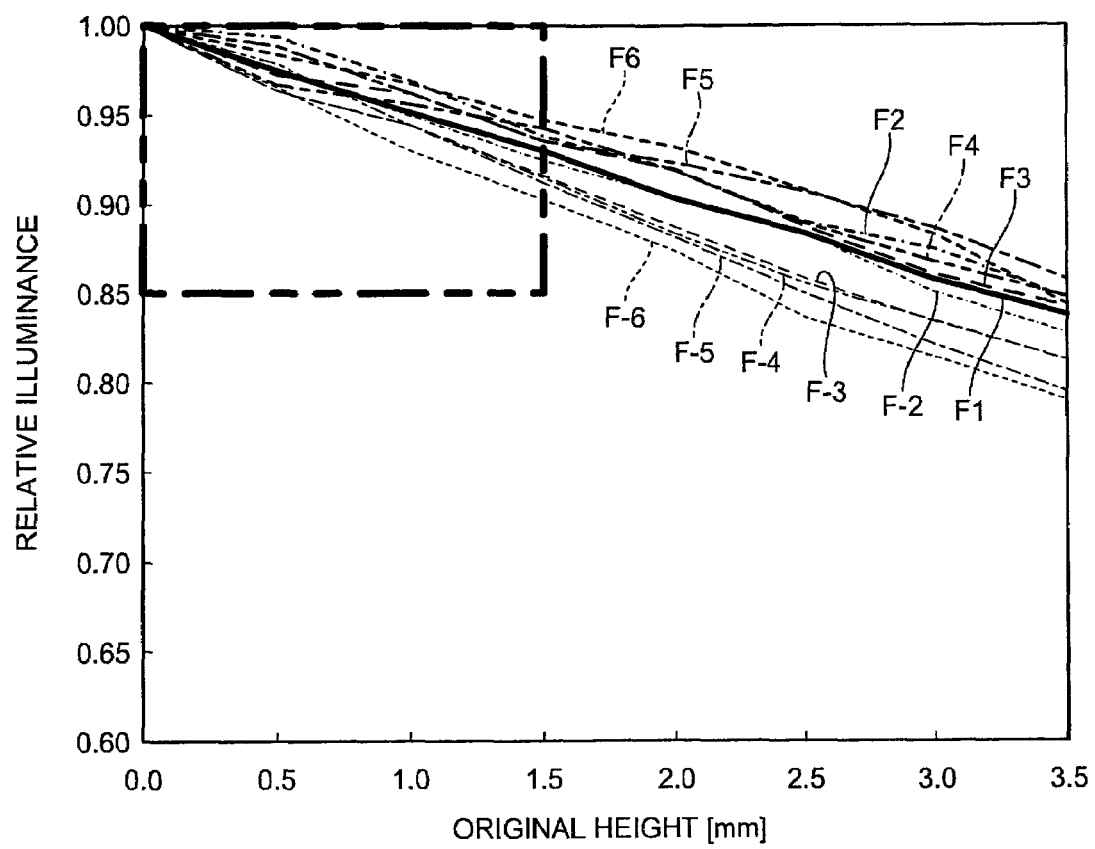
FIG. 21 depicts illuminance attenuation (illumination depth) corresponding to a sub-scanning position of the illuminating device and the image reading apparatus according to the example.

FIG. 20 depicts illuminance distribution in a sub-scanning direction corresponding to an original height in an illuminating device and an image reading apparatus according to an example of the present invention, and FIG. 21 depicts illuminance attenuation (illumination depth) corresponding to a sub-scanning position of the illuminating device and the image reading apparatus in the example. The example is explained with reference to FIGS. 21 and 22.

In the illuminating device 200 and the image reading apparatus 201 according to the second embodiment, the LED-array light source 101, the white reflecting surface 102, and the mirror surface 103 are arranged such that W/2=2 mm, t=2.0 mm, n=1.5, $L_0$=11.24 mm, $\theta_W$=10°, $\theta_\alpha$=19.7°, $\theta_\beta$=29.3°, $\theta_R$=18°, $L_1$=9.7 mm, $L_M$=9.7 mm, and $L_1/L_0 \cdot \cos\theta_R/\cos\theta_\beta$=0.87, and illuminance distribution in the sub-scanning direction corresponding to the original height and illuminance attenuation (illumination depth) corresponding to the sub-scanning direction are measured.

In FIG. 20, the sub-scanning direction is plotted on the horizontal axis, the relative illuminance is plotted on the vertical axis, a line E1 represents a case of the original height (distance from the surface 110 of the glass plate 104 to the surface of the sheet S) being 0.0 millimeter, a line E2 represents a case of the original height being 0.5 millimeter, a line E3 represents a case of the original height being 1.0 millimeter, a line E4 represents a case of the original height being 1.5 millimeters, a line E5 represents a case of the original height being 2.0 millimeters, a line E6 represents a case of the original height being 2.5 millimeters, a line E7 represents a case of the original height being 3.0 millimeters, and a line E8 represents a case of the original height being 3.5 millimeters.

In FIG. 21, the original height is plotted on the horizontal axis, the relative illuminance is plotted on the vertical axis, a line F1 represents a case that the sub-scanning direction is the central position of the read range W (that is, on the first plane P1), a line F2 represents a case that the sub-scanning direction is shifted from the central position of the read range W toward the mirror surface 103 by 0.4 millimeter, a line F3 represents a case that the sub-scanning direction is shifted from the central position of the read range W toward the mirror surface 103 by 0.8 millimeter, a line F4 represents a case that the sub-scanning direction is shifted from the central position of the read range W toward the mirror surface 103 by 1.2 millimeters, a line F5 represents a case that the sub-scanning direction is shifted from the central position of the read range W toward the mirror surface 103 by 1.6 millimeters, a line F6 represents a case that the sub-scanning direction is shifted from the central position of the read range W toward the mirror surface 103 by 2.0 millimeters, a line F-2 represents a case that the sub-scanning direction is shifted from the central position of the read range W toward the LED-array light source 101 by 0.4 millimeter, a line F-3 represents a case that the sub-scanning direction is shifted from the central position of the read range W toward the LED-array light source 101 by 0.8 millimeter, a line F-4 represents a case that the sub-scanning direction is shifted from the central position of the read range W toward the LED-array light source 101 by 1.2 millimeters, a line F-5 represents a case that the sub-scanning direction is shifted from the central position of the read range W toward the LED-array light source 101 by 1.6 millimeters, and a line F-6 represents a case that the sub-scanning direction is shifted from the central position of the read range W toward the LED-array light source 101 by 2.0 millimeters.

As is obvious from FIGS. 20 and 21, in the illuminating device and the image reading apparatus in the example, because the LED-array light source 101, the white reflecting surface 102, and the mirror surface 103 are arranged to satisfy $0° < \theta_W < \theta_R < 90°$ as well as $15° \leq \theta_\alpha$, $30° \geq \theta_\beta$, $0.6 < L_1/L_0 \cdot \cos\theta_R/\cos\theta_\beta < 1.0$, $10° \leq \theta_R \leq 30°$, and $L_M \leq L_1$, the quantity of irradiation light in the entire read range W can be sufficiently ensured, while appropriately stabilizing (uniformizing) illuminance distribution in the sub-scanning direction, and sufficient illumination depth can be ensured.

According to the present invention, downsizing of the device and the illumination efficiency can be realized at the same time.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An illuminating device comprising:
    a linear light source mounted on a mounting surface of a board, with a plurality of light-emitting elements being arrayed thereon for irradiating light toward an illuminating target;
    a white reflecting surface provided in a planar shape parallel to an optical axis of the linear light source on a surface including the mounting surface, to reflect light from the linear light source; and
    a mirror surface formed in a planar shape that reflects the light from the linear light source and reflected light from the white reflecting surface, wherein
    when a surface including an optical axis of an imaging optics that images the reflected light from the illuminating target, and a row of pixels of a line sensor in which a plurality of pixels that convert the reflected light from the illuminating target imaged by the imaging optics to an electric signal and read an image on the illuminating target are arrayed in a main scanning direction is designated as a first plane,
    a surface including the mirror surface is designated as a second plane,
    a surface including the white reflecting surface is designated as a third plane,
    a region of space on one side where the linear light source and the white reflecting surface are arranged, using the first plane as a boundary, is designated as a light source region,
    a region of space on the other side where the mirror surface is arranged, using the first plane as a boundary, is designated as a mirror region,
    a first angle formed by the first plane and the second plane on the mirror region side and on the illuminating target side is designated as $\theta_R$, and
    a second angle formed by the first plane and the third plane on the light source region side and on the linear light source side is designated as $\theta_W$,
    the linear light source, the white reflecting surface, and the mirror surface are arranged such that the third plane crosses the first plane on the illuminating target side than the second plane, and $0° < \theta_W < \theta_R < 90°$ is satisfied.

2. The illuminating device according to claim 1, further comprising a transparent member formed of a planar transparent material and arranged between the linear light source and the illuminating target, with both surfaces thereof on the linear light source side and the illuminating target side being orthogonal to the first plane, wherein
    when a thickness of the transparent member along a direction orthogonal to the surfaces is designated as t,
    a refractive index of the transparent member is designated as n,
    a range in which a central position in a sub-scanning direction orthogonal to the main scanning direction is positioned on the first plane, which is a range in which the line sensor can read the image on the illuminating target in the sub-scanning direction, is designated as a read range,
    a plane including a boundary of the read range on the linear light source side and parallel to the first plane is designated as a fourth plane,
    a plane at a position of $(1-1/n) \cdot t$ from the surface of the transparent member on the illuminating target side toward the linear light source side, which is parallel to the surface and orthogonal to the first plane, is designated as a fifth plane,
    a plane including a line of intersection between the fourth plane and the fifth plane and a center of the linear light source is designated as a sixth plane,
    a plane including a line of intersection between the first plane and the fifth plane and the center of the linear light source is designated as a seventh plane,
    a plane including a boundary of the read range on the mirror surface side and parallel to the first plane is designated as an eighth plane,
    a third angle formed by the first plane and the sixth plane on the fourth plane side and on the linear light source side is designated as $\theta_\alpha$,
    a fourth angle formed by the first plane and the seventh plane on the fourth plane side and on the linear light source side is designated as $\theta_\beta$,
    a distance from the line of intersection between the first plane and the fifth plane to the center of the linear light source is designated as $L_0$,
    a distance from a line of intersection between the second plane and the eighth plane to a line of intersection between the second plane and the surface of the transparent member on the linear light source side is designated as $L_1$, and
    a length of the mirror surface along a direction orthogonal to the line of intersection between the second plane and the eighth plane and the line of intersection between the second plane and the surface of the transparent member on the linear light source side is designated as $L_M$,
    the linear light source, the white reflecting surface, and the mirror surface are arranged to satisfy $15° \leq \theta_\alpha$, $30° \geq \theta_\beta$, $0.6 < L_1/L_0 \cdot \cos\theta_R/\cos\theta_\beta < 1.0$, $10° \leq \theta_R \leq 30°$, and $L_M \leq L_1$.

3. The illuminating device according to claim 1, wherein the white reflecting surface is formed of a white resist on the mounting surface of the board.

4. The illuminating device according to claim 1, wherein the white reflecting surface is formed of a white reflecting sheet material made of a resin, provided on the mounting surface of the board or on a wall body on which the board is mounted.

5. The illuminating device according to claim 1, wherein
the board is provided in a board installation groove of a wall body having the board installation groove, which is set to have a depth substantially equal to a thickness of the board,
the white reflecting surface is formed of a white reflecting sheet material made of a resin, provided in a sheet installation groove formed continuously with the board installation groove on a light irradiating side by the linear light source on the wall body, and
the sheet installation groove is set to have a depth substantially equal to a thickness of the sheet.

6. The illuminating device according to claim 1, wherein
the board is provided in a board installation groove of a wall body having the board installation groove, which is set to have a depth substantially equal to a thickness of the board, and
the white reflecting surface is formed of a white coating applied to a portion continuous with the board installation groove on a light irradiating side by the linear light source on the wall body.

7. The illuminating device according to claim 1, wherein the mirror surface is formed of a mirror sheet material formed by depositing a metal on a resin member.

8. The illuminating device according to claim 1, further comprising a casing that accommodates the linear light source, the white reflecting surface, and the mirror surface therein, which comprises a light-source-side wall body provided with the linear light source and the white reflecting surface, a mirror-side wall body provided with the mirror surface, and a connecting wall body that connects the light-source-side wall body and the mirror-side wall body on a side opposite to the light irradiating side by the linear light source, formed integrally, the connecting wall body being provided with an opening corresponding to the read range in which the line sensor can read the image on the illuminating target in the sub-scanning direction, which is a range with a center in the sub-scanning direction orthogonal to the main scanning direction being positioned on the first plane.

9. The illuminating device according to claim 1, further comprising a casing that accommodates the linear light source, the white reflecting surface, and the mirror surface therein, which comprises an integrally formed light-source-side wall body provided with the linear light source, a mirror-side wall body provided with the mirror surface, and a connecting wall body that connects the light-source-side wall body and the mirror-side wall body on a side opposite to the light irradiating side by the linear light source, formed integrally by a white resin material, the connecting wall body being provided with an opening corresponding to the read range in which the line sensor can read the image on the illuminating target in the sub-scanning direction, which is a range with a center in the sub-scanning direction orthogonal to the main scanning direction being positioned on the first plane, wherein
the white reflecting surface is formed by the light-source-side wall body, and
the mirror surface is formed by depositing a metal on the mirror-side wall body.

10. The illuminating device according to claim 8, wherein the light-source-side wall body and the mirror-side wall body respectively have a fitting portion made of a transparent member arranged between the linear light source and the illuminating target at an end portion thereof on the light irradiating side by the linear light source.

11. The illuminating device according to claim 9, wherein the light-source-side wall body and the mirror-side wall body respectively have a fitting portion made of a transparent member arranged between the linear light source and the illuminating target at an end portion thereof on the light irradiating side by the linear light source.

12. An image reading apparatus comprising:
an imaging optics that images reflected light from an illuminating target;
a line sensor in which a plurality of pixels that convert the reflected light from the illuminating target imaged by the imaging optics to an electric signal and read an image on the illuminating target are arrayed in a main scanning direction; and
an illuminating device, wherein
the illuminating device comprising
a linear light source mounted on a mounting surface of a board, with a plurality of light-emitting elements being arrayed thereon for irradiating light toward the illuminating target,
a white reflecting surface provided in a planar shape parallel to an optical axis of the linear light source on a surface including the mounting surface, to reflect light from the linear light source, and
a mirror surface formed in a planar shape that reflects the light from the linear light source and reflected light from the white reflecting surface, wherein
when a surface including an optical axis of the imaging optics, and a row of the pixels of the line sensor is designated as a first plane,
a surface including the mirror surface is designated as a second plane,
a surface including the white reflecting surface is designated as a third plane,
a region of space on one side where the linear light source and the white reflecting surface are arranged, using the first plane as a boundary, is designated as a light source region,
a region of space on the other side where the mirror surface is arranged, using the first plane as a boundary, is designated as a mirror region,
a first angle formed by the first plane and the second plane on the mirror region side and on the illuminating target side is designated as $\theta_R$, and
a second angle formed by the first plane and the third plane on the light source region side and on the linear light source side is designated as $\theta_W$,
the linear light source, the white reflecting surface, and the mirror surface are arranged such that the third plane crosses the first plane on the illuminating target side than the second plane, and $0°<\theta_W<\theta_R<90°$ is satisfied.

* * * * *